United States Patent

[11] 3,588,438

[72] Inventor Peter W. Vanderhelst
Livonia, Mich.
[21] Appl. No 755,158
[22] Filed Aug. 26, 1968
[45] Patented June 28, 1971
[73] Assignee Robotron Corporation
Detroit, Mich.

[54] ELECTRICAL CIRCUIT
34 Claims, 26 Drawing Figs.

[52] U.S. Cl.................................................. 219/117,
219/110
[51] Int. Cl.................................................. B23k 11/24
[50] Field of Search........................................... 219/108-
—110, 114

[56] References Cited
UNITED STATES PATENTS 2,508,330 5/1950 Callender et al.............. 219/110
3,345,493 10/1967 Guettel et al. ................ 219/110

Primary Examiner—J. V. Truhe
Assistant Examiner—J. G. Smith
Attorney—Woodhams, Blanchard and Flynn ABSTRACT: A method and apparatus of resistance welding control for sensing the contact resistance at the welding position, terminating weld current within a predetermined time range and at a predetermined fraction of the value of the contact resistance if such is reached within said time range and providing alarms indicative of present weld condition and impending degradation. The contact resistance is determined by detecting the amplitude peak of the weld current waveform and thereupon charging a storage device at a rate proportional to the instantaneous electrode voltage for a relatively short interval inversely proportional to the peak weld current amplitude to produce a pulse of height proportional to the instantaneous contact resistance. Weld termination means responsive to the instantaneous contact resistance terminates the weld current when the contact resistance reaches a predetermined fraction of its peak value or at least within a selected time range. A plurality of timers cause the weld termination means to terminate weld current at the beginning of said range if the contact resistance is less than said predetermined fraction or at the end of said time range if the instantaneous contact resistance has not then reached said fractional value. Alarms are actuated to indicate questionable or doubtful present welds and impending process degradation.

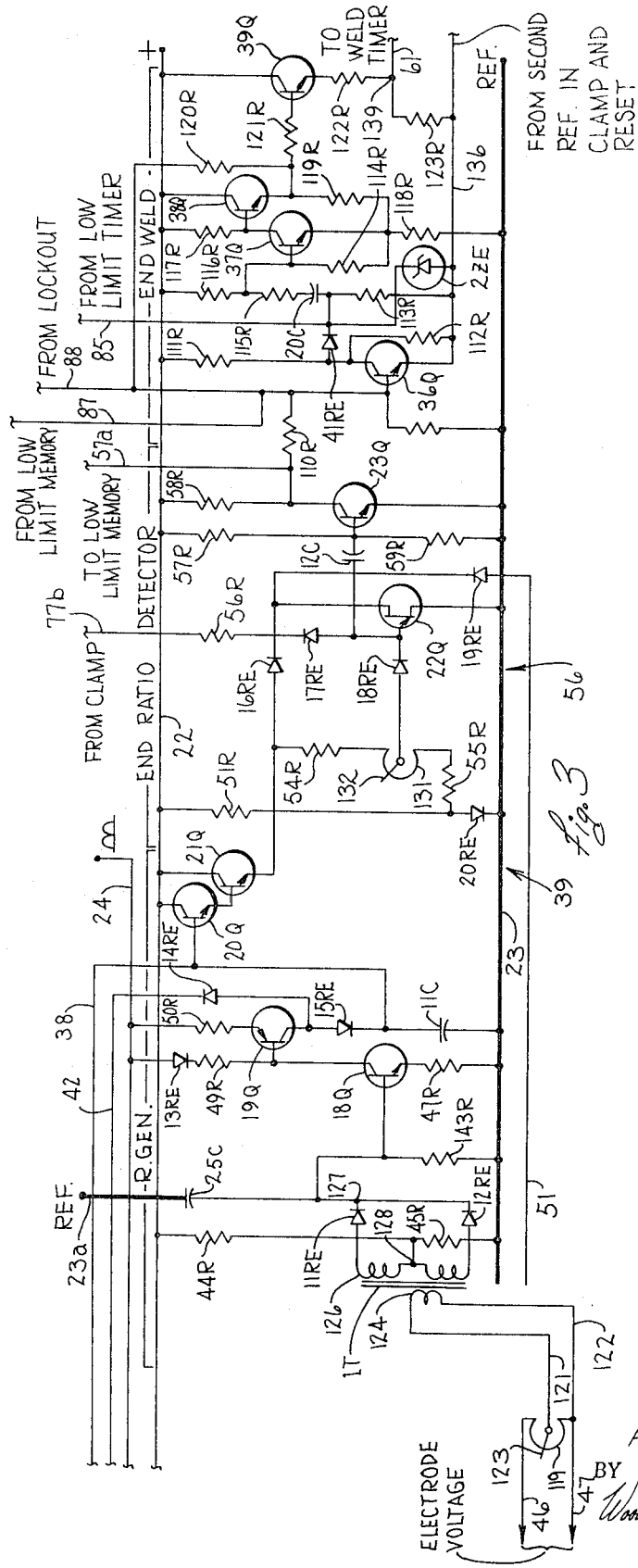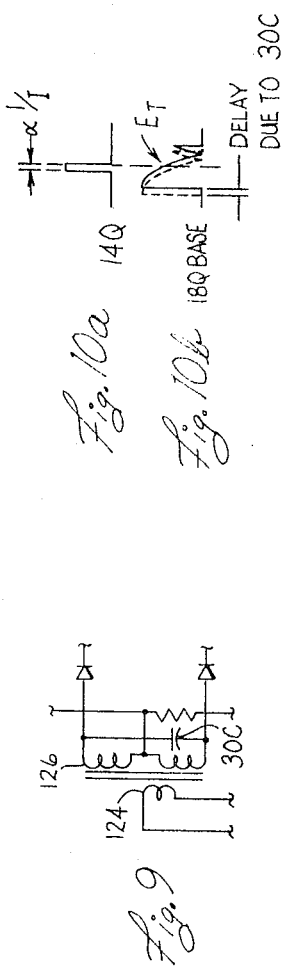

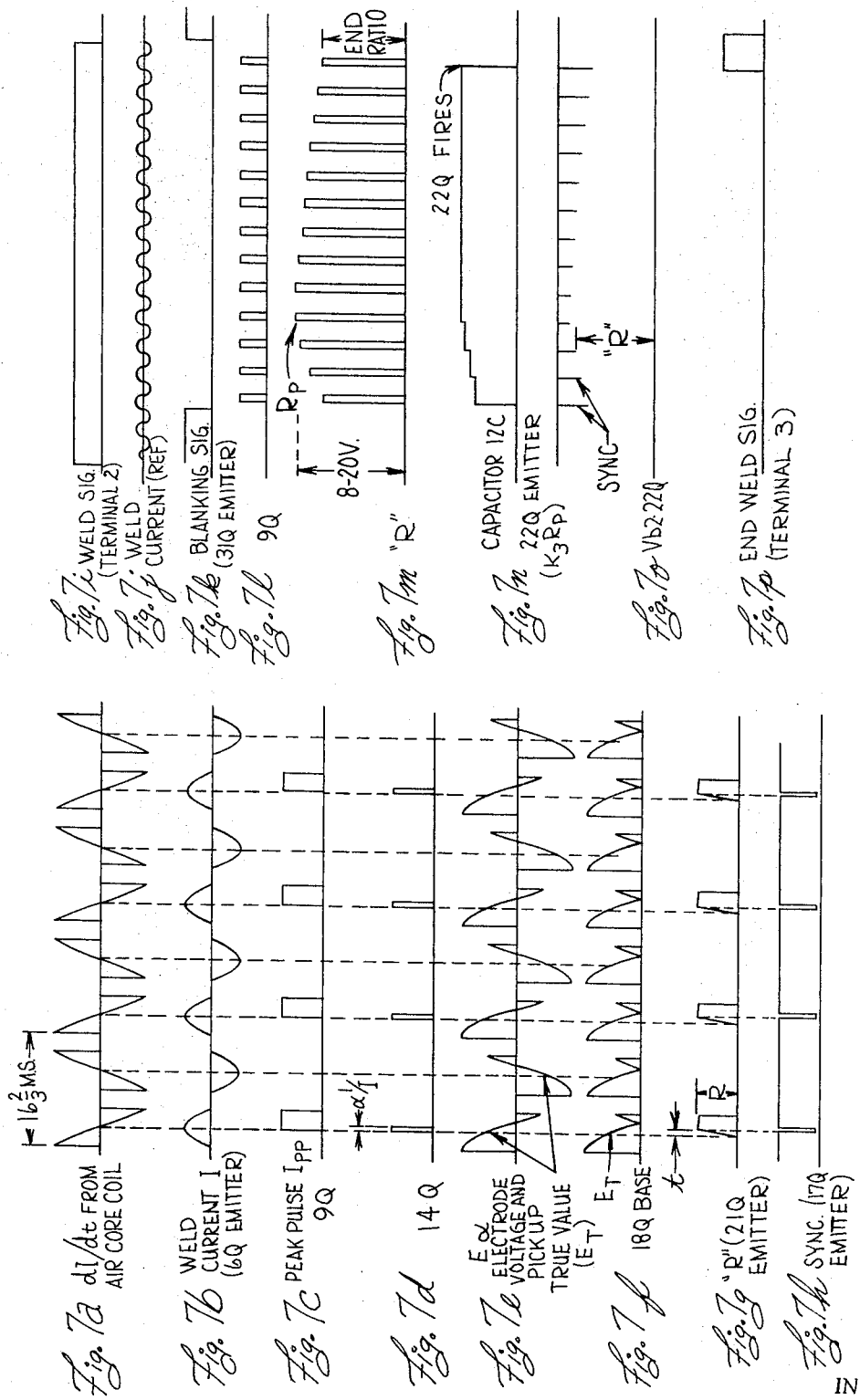

3,588,438

ELECTRICAL CIRCUIT

BACKGROUND OF THE INVENTION

1. Field of the Invention

This invention relates to a method and apparatus for resistance feedback welding control and more particularly relates to such a method and apparatus incorporating an improved, simplified means for providing a signal proportional to the instantaneous weld contact resistance for normally terminating the weld in response to the contact resistance sensed and for warning of present or impending questionable or bad welds. 2. Description of the Prior Art It is highly unusual for a common industrial welding machine to produce 100 percent good welds without exceptional maintenance and quality control measures being taken. No welding control presently known is capable of providing absolute quality assurance. It is possible, however, to monitor some process variable which is related to weld quality, to make in process adjustments to arrive at the desired state of that variable and, by observation of the adjustments made, to determine whether or not the process is a consistent one.

The process parameter here chosen for monitoring is the change in the weld electrical resistance (contact resistance) that occurs during the weld time. It has been found that the resistance of a spot weld varies according to a predictable pattern as the weld is being formed. For the first few cycles of welding, the resistance may be erratic due to metal fit and surface condition variables but the general trend is for the resistance to increase as the stock is heated by the weld current. At some point in the weld interval, the resistance will peak and then begin to decrease. It is theorized that this decrease in weld resistance is due to metal fusion and the resulting destruction of the interface resistance of the parts to be welded. It is possible to relate the percentage drop in weld resistance (from the peak value) during the weld time to weld nugget size. For example, in the welding of two pieces of clean 0.060 inch mild steel, a resistance drop of 15 percent in a reasonable weld time with reasonable electrode force will be found to produce a good weld.

An important advantage of the method based on the above considerations is the fact that the desirable percentage resistance drop for a given spot welder changes relatively little as weld current, electrode area, stock thickness or number of layers of stock are varied. As a result, it is possible to arrive with a desired resistance percentage drop setting that will enable welding of, for example, two pieces of 0.035 inch stock or three pieces of 0.060 inch stock reliably without the need for separate selectors on the control station.

The basic method resulting from the above consideration is the monitoring of the weld contact resistance (disregarding the first few erratic cycles), remembering electronically the peak (highest) value of the resistance reached during the weld interval and allowing the weld time to continue until the resistance has decreased by a preset percentage. Means which have been found highly satisfactory for carrying out such a welding method are disclosed in pending applications Ser. Nos. 650,714 and 650,789 assigned to the assignee of the present invention.

With respect to method and apparatus for sensing the instantaneous weld contact resistance, the method and apparatus of above-mentioned applications Ser. No. 650,714 is reliable and highly accurate and may still be preferred for certain highly critical applications. However, it is relatively complex in comparison to the method and apparatus of the present invention.

Further, the apparatus of the above-mentioned application makes no provision for detecting slow degradation of process variables such as a damaged and gradually deteriorating secondary welding cable. Such a defect could, if undetected, eventually increase the required weld interval to a point beyond the maximum tolerable to make the required production rate. At such time, the welds would turn bad and nothing short of maintenance would restore good welds. Such a condition would be highly disadvantageous if occurring during peak production hours on an assembly line. It would be far better if the slowly changing process parameters could be made to give an early warning that the process was drifting so that maintenance could be scheduled for a convenient time.

Thus, it is among the objects and purposes of this invention: 1. To provide a simplified method and apparatus for resistance feedback welding control. 2. To provide a simplified method and apparatus, as aforesaid, in which the contact resistance at the weld position is sensed and weld current is normally terminated when the contact resistance falls to a preselected fraction of its peak value, such fraction being referred to as the end ratio. 3. To provide a method and apparatus, as aforesaid, including a simplified method and apparatus for sensing the weld contact resistance which is highly reliable and accurate and at least to a close degree approaches the accuracy of the corresponding resistance sensing means of the aforementioned applications and which, at least for many purposes, may be used instead of the means of the aforementioned applications. 4. To provide a method and apparatus of weld contact resistance sensing, as aforesaid, in which parameters of the weld circuit are sensed and used immediately to provide an output proportional to contact resistance and in which continuous storage of such parameters is unnecessary. 5. To provide a method and apparatus of weld contact resistance sensing, as aforesaid, which generates weld contact resistance signal from inputs related to the weld current and electrode voltage in a manner different from and considerably simpler than that of the aforementioned applications and which eliminates considerable apparatus including a high frequency oscillator and flip-flop circuit. 7. To provide a method and apparatus of weld contact resistance sensing, as aforesaid, which directly combines parameters related to the welding current peak amplitude and the electrode voltage, taken at the weld current peak, to form an output of amplitude proportional to the instantaneous weld contact resistance. 8. To provide a method and apparatus of weld contact resistance sensing, as aforesaid, which periodically produces pulses of amplitude proportional to the weld contact resistance and which eliminates the necessity for, but which is readily adaptable to, pulse averaging to produce a continuous contact resistance signal output. 9. To provide a method and apparatus of weld contact resistance sensing, as aforesaid, in which the number of iron core transformers required is substantially reduced from the apparatus of the aforementioned applications and in which substantial quantities of circuitry are omitted. 10. To provide a method and apparatus of resistance feedback welding control, as aforesaid, which provides an early warning of shifts in process variables which if unchecked could result in bad welds, so that required corrective maintenance can be performed at convenient times outside of normal production periods and which, in addition, indicates the quality of welds as they are made.

Other objects and purposes of this invention will be apparent to those acquainted with methods and apparatus of this general type upon reading the following specification and inspecting the accompanying drawings.

In the drawings:

FIG. 3 is a schematic circuit diagram disclosing the R generator portion of the weld contact resistance sensing unit of FIG. 1 together with the end ratio detector and end weld portion of the weld terminating unit of FIG. 1.

FIGS. 7a—p are diagrams disclosing waveforms found in the circuit of FIGS. 1—5.

Figure 8:
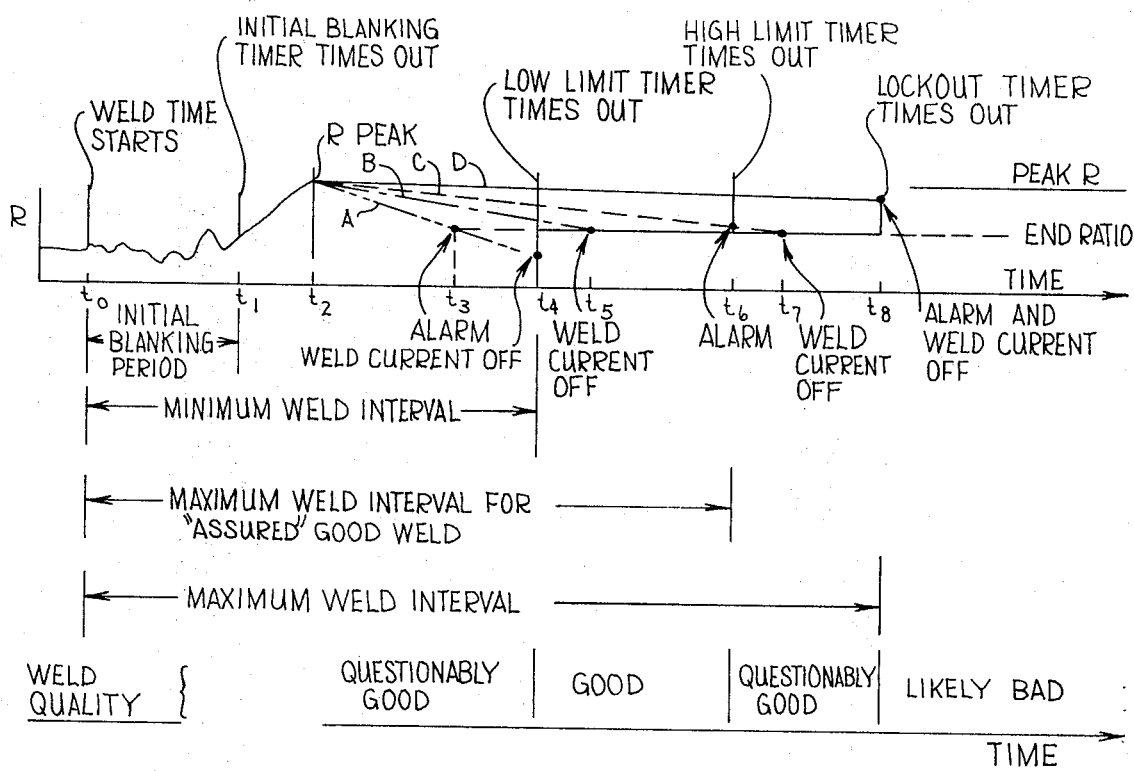

FIG. 8 is a plot of contact resistance versus time disclosing a plurality of weld contact resistance drop characteristics.

FIG. 9 is a modified segment of FIG. 3.

FIGS. 10a, b are diagrams disclosing waveforms resulting from the modification of FIG. 9.

SUMMARY OF THE INVENTION

The objects and purposes of this invention are met by providing a resistance feedback welding control comprising a weld contact resistance sensing unit and weld current terminating unit together with quality indicating means. The resistance sensing unit comprises an air core transformer in the secondary of the welding circuit which detects the rate of change at weld current with respect to time ($dI/dt$) and applies same to an integrating amplifier. The integrating amplifier provides a signal proportional to the weld current (I) which is applied to a peak pulse circuit and an R time base circuit. The peak pulse circuit detects the time at which the peak amplitude of the weld current occurs and provides an output at such time. The R time base circuit provides an output, the duration of which is inversely proportional to the peak amplitude of the weld current. A weld electrode voltage sensor senses the electrode voltage E and provides a current output proportional thereto. An R generator circuit responsive to the peak pulse, R time base and electrode voltage sensing circuits includes storage means chargeable in response to the output of the peak pulse circuit at rate determined by the output of the electrode voltage sensor and for a time determined by the R time base circuit to produce an output R pulse of amplitude proportional to the weld contact resistance. The method of resistance sensing thus involves determining the time at which the weld current peaks, generating a time parameter inversely proportional to the weld current peak amplitude, detecting the electrode voltage and generating current proportional thereto and, at the time of the weld current amplitude peak, charging storage means with said current for the duration of said time parameter to provide an output potential proportional to the instantaneous weld contact resistance.

The weld terminating unit comprises an end ratio detector which determines when the weld contact resistance has reached a preselected fraction of its peak value (the end ratio) and an end weld circuit responsive thereto for terminating the weld current when said contact resistance reaches the end ratio. In addition, a plurality of timing circuits cause weld current termination to occur within a preselected time range. The timing circuits provide alarms upon failure of the weld contact resistance to reach the end ratio within said time range and when the end ratio occurs late in said time range indicating a degradation of process parameters which ultimately may result in a bad weld.

DETAILED DESCRIPTION

The resistance feedback welding control 10 (FIG. 1) embodying the invention is intended for use with a conventional resistance welding machine indicates in part at 11 and including a weld timer 12 controlling a firing circuit 13 adapted to supply weld current to weld electrodes 14 through a welding transformer 16. The weld timer 12 may include a suitable interfacing adapter of any convenient type to adapt signal voltages flowing either from or to the control 10 to the requirements of the weld timer 12.

The resistance feedback welding control 10 broadly comprises a weld contact resistance sensing unit 18 and a weld terminating unit generally indicated at 19.

A DC power supply 21 of any convenient type supplies DC operating potential to the hereinafter described portions of the units 18 and 19 through a DC positive potential line 22, a reference or zero potential line 23 and a positive full wave rectified, unfiltered potential line 24.

The weld contact resistance sensing unit 18 includes an air core coil 26 which is inductively coupled to the secondary circuit 27 of the weld transformer 16 for sensing the time rate of change of weld current ($dI/dt$ and an integrating amplifier 28 driven by the coil 26 for producing a continuous signal voltage I proportional to the instantaneous weld current. It is contemplated that the preferred air core coil 26 and integrating amplifier 28 may be replaced by an iron core transformer though at least at the penalty of added expense.

The $i$ current signal I is applied to a peak pulse circuit 31 and to an R time base circuit 32 through weld current signal lines 34 and 35. The peak pulse circuit 31 produces a positive going peak pulse ($Ipp$) beginning at the weld current amplitude maximum and applies same through peak pulse line 38 to a weld contact resistance (R) signal generator circuit 39. The peak pulse circuit provides a corresponding negative going pulse to the R time base circuit through a line 37.

The R time base circuit 32 provides a short time pulse (the 1/I pulse) at the time of peak weld current amplitude, the duration of which is inversely proportional to the peak weld current amplitude, and applies same through lines 42 and 41, respectively, to the R generator 39 and to a synch circuit 43. The R generator 39 is fed the voltage appearing across the welding electrodes 14 through lines 46 and 47. In response to these inputs, the R generator generates a pulse of amplitude proportional to the weld contact resistance (the R pulse) on line 49. The synch circuit 43 provides a short synch pulse, coincidental with peaking of the R pulse and of opposite sign, on synch line 51.

The weld termination unit 19 comprises an end ratio detector 56, fed by the R generator 39 and synch circuit 43 through lines 49 and 51, respectively. The end ratio detector normally provides an end ratio pulse on line 57 in response to a drop of the weld contact resistance to a preselected fraction, termed the end ratio, of its peak value. The end ratio pulse line 57 drives an end weld circuit 59. When the weld contact resistance reaches the end ratio within a preselected time range, as hereinafter discussed, the end weld circuit 59 provides an end weld signal on line 61 to the weld timer 12 for causing same to terminate the weld interval.

The weld terminating unit 19 further includes a plurality of timers comprising a high limit timer 63, an initial blanking timer 64, a low limit timer 67 with a low limit memory circuit 71 and a lockout timer 68, for timing various periods within the weld interval, as well as alarm circuitry 72 and a clamp and reset circuit 74 for controlling the actuation of the aforementioned timers as well as other portions of the control 10. More particularly, the clamp and reset circuit 74 is provided with a weld interval signal through a line 76 from the weld timer 12. The clamp and reset circuit 74 provides clamping potentials at times outside the weld interval through a clamp line 77 to the aforementioned timers 63, 64, 67 and 68 and also provides reset signals on a reset line 78 to the high limit timer 63, low limit memory 71 and lockout timer 67. Extensions 77a and 77b of the clamp line 77 supply clamp signals to the R generator 39 and end ratio detector 56 to prevent their operation outside the weld interval. Portions of the alarm circuit 72 are responsive to the high limit timer 63, low limit memory 71 and lockout timer 68 as indicated schematically by the broken line 81.

Considering the connections of timers 63, 64, 66 and 67 to other portions of the control 10, the initial blanking timer 64 provides an output on an initial blanking line 84 to the peak pulse circuit 31 to bar operation thereof during the initial unstable resistance portion of the weld interval. The low limit timer 67 signals the end of the low limit period through a line 86 to the low limit memory 71 and through a line 85 to the end weld circuit 59. The low limit memory 71 is supplied to the end ratio pulse by an extension 57a of the end ratio line 57. Should the end ratio occur before the end of the low limit period, the low limit memory 71 provides an output on a line 87 to the end weld circuit 59 for causing weld termination at the end of the low limit period. The lockout timer 67 signals the end of the lockout interval through a line 88 to the end weld circuit 59 to cause the weld to be then terminated if the end weld circuit has not previously done so.

Unless otherwise noted, the transistors in the circuitry described hereinafter are for purpose of convenience illustrated as NPN types. However, it will be apparent that the control 10 embodying the invention is readily adapted to use with components of opposite polarity to that shown, if desired.

RESISTANCE SENSING UNIT 18

The resistance sensing unit 18 (FIG. 2) provides an output signal I representational of the weld current waveform. The air core coil 26 has a current balance potentiometer 102 connected thereacross. The armature 103 of said potentiometer connects through a resistor IR to the input terminal 106 of the integrator-amplifier 28 for applying a signal $(dI/dt)$ thereto proportional to the time rate of change of weld current. A Zener diode 1ZE is connected at its anode to the reference potential line 23 and at its cathode through a series resistor 6R and diode 1RE to the positive potential line 22 so that the upper or cathode end of the Zener remains at a constant potential intermediate those of lines 23 and 22, here about 12 volts positive. One end of the air core coil 101 is connected through a resistor 2R and Zener diode 1ZE to the reference line 23.

The amplifier 28 is a high gain phase inverting DC amplifier comprising transistors 1Q—6Q. Transistors 1Q and 2Q are connected as a double emitter follower, the emitter of transistor 1Q being connected to the base of transistor 2Q. The base of transistor 1Q directly connects to the input terminal 106. The collectors of transistors 1Q and 2Q connect directly to the positive potential line 22. The emitter of transistor 2Q connects through resistor 3R to the reference line 23. The double emitter follower 1Q, 2Q reduces the current drawn by the amplifier 1Q—6Q from the air core coil 101 to a negligible level.

Transistors 3Q and 4Q are also connected as a double emitter follower, the emitter of transistor 4Q being connected to the base of transistor 3Q.

The collectors of transistors 3Q and 4Q connect, the former through a resistor 4R, to the positive potential line 22. The emitter of transistor 3Q connected to the emitter of aforementioned transistor 2Q. The base of transistor 4Q connects to the upper end of Zener diode 1ZE and is held thereby at a constant positive potential. As a result, transistor 4Q conducts at a constant rate through the base-emitter junction of transistor 3Q whereby the current flow through transistor 3Q and voltage drop across resistor 4R are linearly related to the emitter signal of transistor 2Q. Thus, the collector signal of transistor 3Q is a linear representation of the input signal at input point 106.

Amplifier transistor 5Q is a PNP type connected at its emitter through the aforementioned diode 1RE to the positive potential line 22 and at its collector through a resistor 9R to the reference line 23. The base-collector junction thereof is bypassed by a series resistor 7R and capacitor 3C. The collector signal of the transistor 3Q is applied to the base of transistor 5Q which provides a phase inverted and amplified output at its collector.

Transistor 6Q comprises an emitter follower output stage, its collector being directly connected to the positive potential line 22 and its emitter being connected through series resistors 10R and 11R to the reference line 23. A calibration resistor 1CL parallels resistor 11R. A capacitor 27C parallels said resistors. The output of amplifier-integrator 28 appears on line 34 connected to the emitter of transistor 6Q. As a result of the phase inversion accomplished by amplifier transistor 5Q, a positive going input to the input terminal 106 will result in a negative going output on line 34.

A signal feedback path 111 is provided between the output and input of the amplifier-integrator 28 and, in conjunction with the amplifier 1Q—6Q integrates the $dI/dt$ signal input to achieve the output signal I corresponding in waveform to the weld current. The feedback path 111 comprises a capacitor 1C connected between the output line 34 and input terminal 106.

In addition, a DC feedback path generally indicated at 112 is provided to achieve long term stability by reducing the gain of the amplifier 1Q—6Q for DC conditions and to establish a stable operating point. The DC feedback path 112 is arranged to hold the resting voltage for the amplifier output at approximately that of the Zener 1ZE. The feedback path 112 comprises series resistors 5R and 8R connected between the input terminal 106 of the amplifier and a point 113 intermediate output emitter resistors 10R and 11R above mentioned. In addition, a relatively large capacitor 2C connects from a point 114 intermediate the DC feedback resistors 5R and 8R to the upper end of Zener diode 1ZE. Capacitor 27 improves stability by shunting transients appearing on the output line 34 to the reference line 23.

PEAK PULSE CIRCUIT 31

The peak pulse circuit 31 detects the point in each cycle of weld current at which the peak weld current amplitude, here the positive peak, occurs and comprises transistors 7Q through 10Q.

Transistors 7Q and 8Q comprise a trigger circuit. Transistor 8Q is connected at its collector through a resistor 16R to the positive potential line 22 and at its emitter through series voltage dropping diodes 5RE and 6RE and line 116 to the upper end of aforementioned Zener 1ZE. A resistor 17R connects from the positive potential line 22 to the emitter of transistor 8Q and operates in conjunction with diodes 5RE and 6RE and Zener 1ZE to stabilize the emitter potential of transistor 8Q. The initial blanking line 84 connects through a series resistor 15R and diode 4RE to the base of transistor 8Q to apply a positive potential thereto during initial blanking period so as to maintain same conductive. The base of transistor 8Q is also connected through a series resistor 14R and diode 3RE to the output line 34 of the integrator circuit 38 so as to conduct in response to a rising I signal conducted through diode 3RE.

Transistor 7Q is connected at its collector between resistor 14R and diode 3RE and is connected at its emitter through the line 116 to the upper end of the Zener 1ZE. When the transistor 7Q is conductive, it blocks diode 3RE and thus prevents transistor 8Q from responding to a rising I signal on the line 34. A capacitor 4C couples the base of transistor 7Q to line 34 and charges while the I signal on line 34 is positive going, the charging current going to the base of transistor 7Q to render same conductive while the capacitor 4C is charging. A bias resistor 13R connects between the base and emitter of transistor 7Q. A diode 2Re parallels said resistor 13R and is oriented with its cathode toward capacitor 4C for discharging same. A series capacitor 5C and resistor 12R connect the collector of transistor 8Q to the base of transistor 7Q for coupling a negative pulse to the base of transistor 7Q upon conduction of transistor 8Q to insure complete and rapid blocking of transistor 7Q at the peak of the weld current and corresponding I signal waveforms and hence insuring rapid and complete conduction of transistor 8Q.

The collector of transistor 8Q is connected through a series coupling capacitor 6C and resistor 18R to the base of input transistor 9Q of the one-shot circuit 9Q, 10Q for coupling thereto a negative pulse upon conduction of the trigger transistor 8Q at the weld current peak amplitude.

The one shot circuit 9Q, 10Q includes dropping resistors 20R and 24R which couple the collectors of transistors 9Q and 10Q, respectively, to the positive potential line 22. The emitters of said transistors are connected directly to the reference potential line 23. Base bias is provided the transistors 9Q, 10Q by bias resistors 19R and 23R, respectively, connected to the reference line 23. A resistor 21R connects the collector of transistor 10Q to the base of transistor 9Q. Series capacitor 7C and resistor 22R connect the collector of transistor 9Q to the base of transistor 10Q. The peak pulse line 38 to the R generator 39 (FIG. 1) connects to the anode of a clamping diode 50RE, the cathode of which connects to the collector of transistor 9Q. The transistor 9Q is normally conductive for drawing clamping current through the line 38, but is blocked at the I signal peak by the trigger 7Q, 8Q for a period of length determined by the RC time constant of capacitor 7C and resistor 22R, the positive peak pulse I$pp$ then appearing on the collector of transistor 9Q for unclamping line 38. Line 37 connects the collector of normally blocked transistor 10Q to the R time base circuit and impresses a negative going pulse thereon during the positive peak pulse I$pp$ on line 38.

R TIME BASE CIRCUIT 32

The R time base circuit comprises transistors 11Q through 15Q produces a 1/I pulse of width inversely proportional to weld current amplitude.

Transistor 11Q connects at its collector through a series resistor 25R and diode 7RE to the full wave potential line 24 and at its emitter through a resistor 27R and aforementioned line 116 to the upper end of Zener diode 1ZE in the amplifier-integrator circuit 28. A calibration resistor 2CL parallels resistor 27R. The weld current signal I from the output line 34 of the amplifier-integrator circuit 38 is coupled through line 35 to the base of transistor 11Q. As a result of the regenerative action of resistor 27R, transistor 11Q conducts collector current proportional to the weld current signal I during positive half cycles thereof. The resulting voltage drop across resistor 25R is thus also proportional to weld current.

Transistor 12Q is a PNP type having its emitter connected through a resistor 26R to the full wave rectified line 24 and its collector connected through a series capacitor 8C and resistor 28R to the reference line 23. A diode 8RE is connected across the resistor 28R with its cathode toward the reference line 23. The base of transistor 12Q is driven from the collector of transistor 11Q and, due to the degenerative action of resistor 26R, transistor 12Q also provides a collector current proportional to the weld current signal I during positive half cycles thereof for charging capacitor 8C.

Transistor 13Q is a unijunction transistor having its upper base connected through a resistor 29R to the positive potential line 22 and its lower base connected directly to the reference line 23. The emitter of unijunction 13Q is connected to the upper plate of capacitor 8C a sufficient charge thereon causing unijunction 13Q to conduct.

Transistors 14Q and 15Q comprise a flip-flop circuit. The collectors of transistors 14Q and 15Q connect through respective resistors 33R and 36R to the positive potential line 22 and the emitters thereof connect directly to the reference line 23. Base bias is provided the transistors 14Q and 15Q through bias resistors 32R and 37R, respectively, which connect to the reference line 23. A resistor 34R couples the base of transistor 15Q to the collector of transistor 14Q and a resistor 35R couples the base of transistor 14Q to the collector of transistor 15Q. A series clamping diode 9RE and resistor 30R connect the upper plate of capacitor 8C to the collector of transistor 14Q to normally clamp the capacitor 8C at a low charge level insufficient to fire unijunction 13Q. The negative going pulse due to blocking of transistor 10Q at the positive weld current peak is coupled from line 37 through a capacitor 26C and series resistor 31R to the base of normally conductive transistor 14Q to block same and thus shift the state of flip-flop 14Q, 15Q.

A series resistor 38R and capacitor 9C connects the base of normally blocked transistor 15Q to the lower plate of capacitor 8C whereby firing of the unijunction 13Q will couple a negative going pulse to the base of transistor 15Q to block same and thus reset the flip-flop 14Q, 15Q. A clamping diode 51RE connects at its cathode to the clamp line 77a from the clamp and reset circuit 74 (FIG. 1), the anode of diode 51RE (FIG. 2) being connected to the collector of flip-flop transistor 14Q to prevent charging of capacitor 8C outside the weld interval. The anode of clamping diode 51RE also connects to the line 42 to the R generator circuit 39 for clamping said line at a low potential outside the weld interval. The line 42 also connects to the collector of transistor 14Q to couple the positive 1/I pulse, appearing on said collector when transistor 14Q blocks, to the R generator circuit as one output of the R time base circuit. Aforementioned line 41 connects the collector of transistor 15Q to the synch circuit 43 to provide a negative going pulse thereto at the time of the 1/I pulse, as the second output of the R time base circuit 32.

SYNCH CIRCUIT 43

Figure 1:
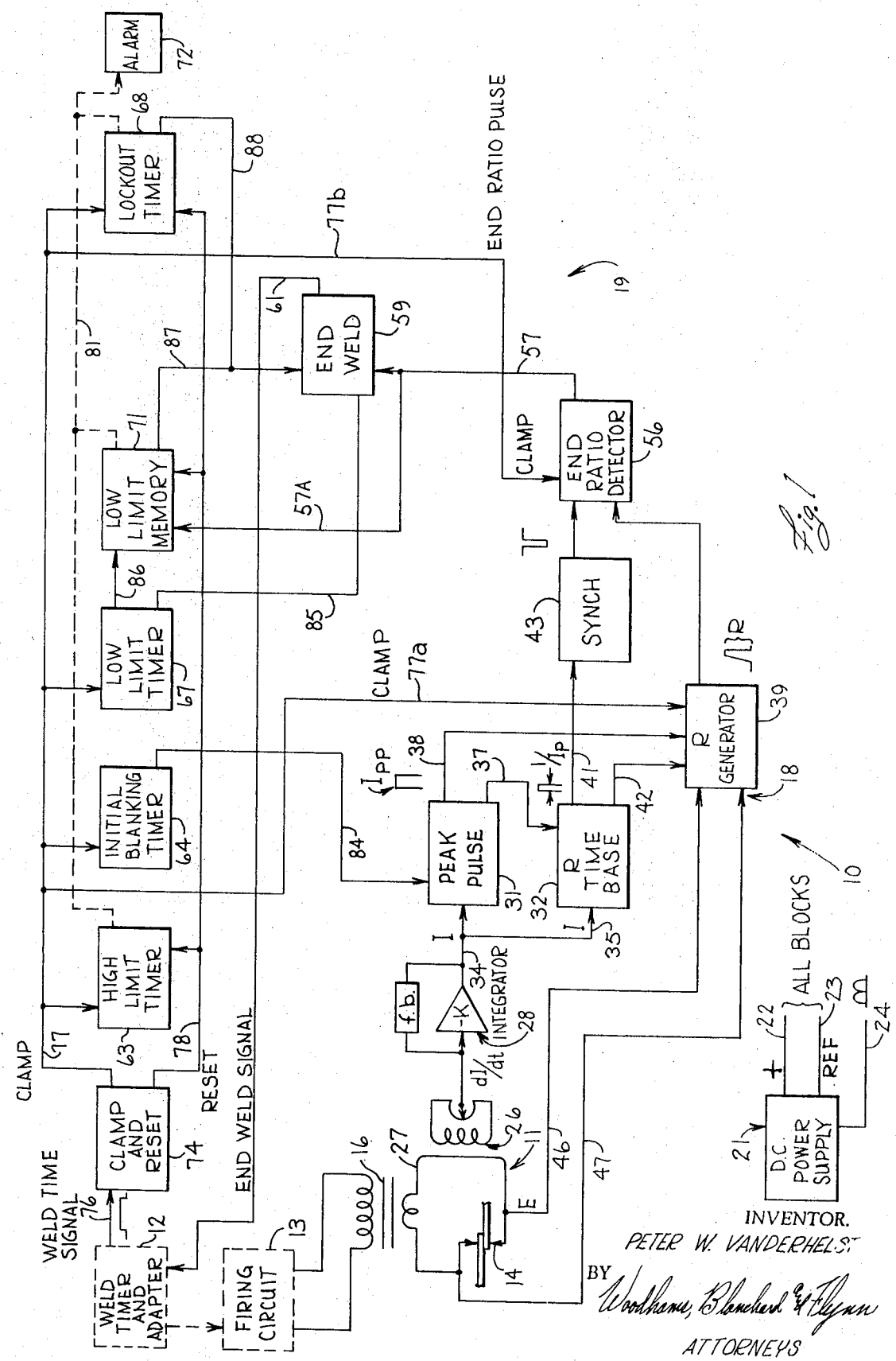
FIG. 1 is a block diagram of the resistance feedback welding control embodying the invention.
Figure 2:
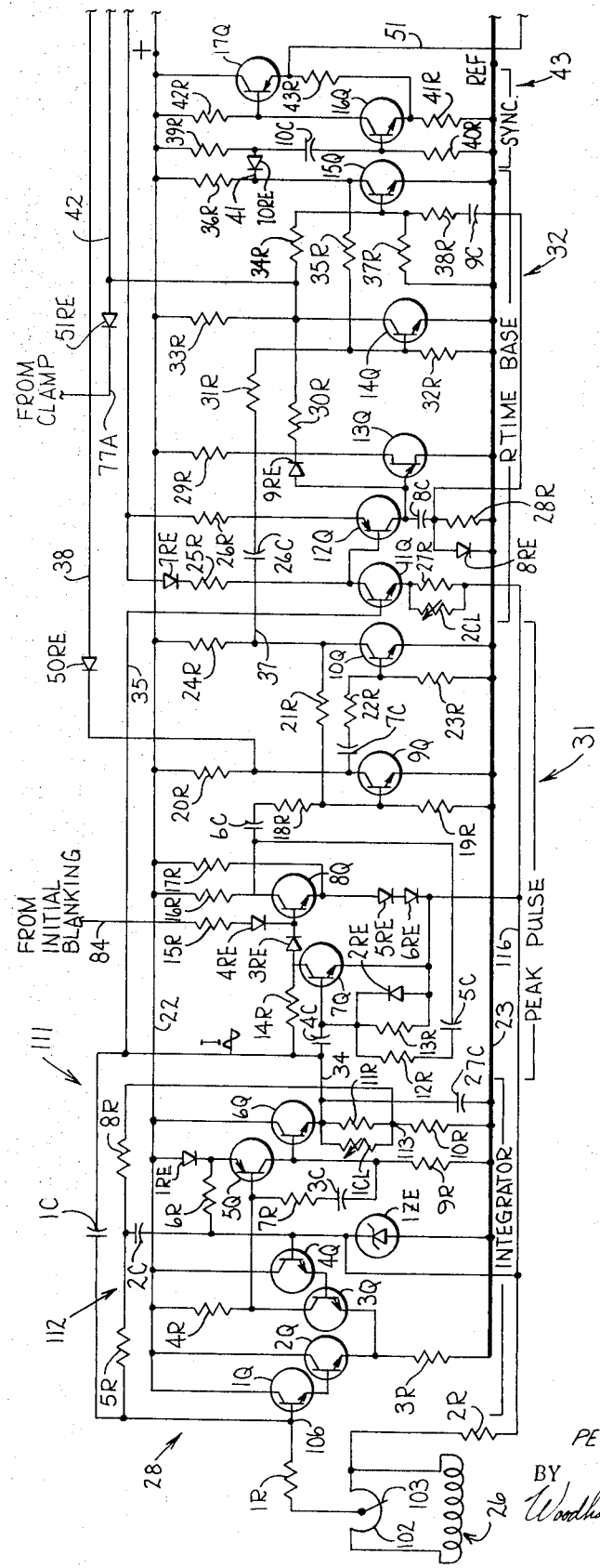
FIG. 2 is a schematic circuit diagram of the integrator-amplifier, peak pulse, R time base, and synch portions of the weld contact resistance sensing unit of the block diagram of FIG. 1.
Figure 4:
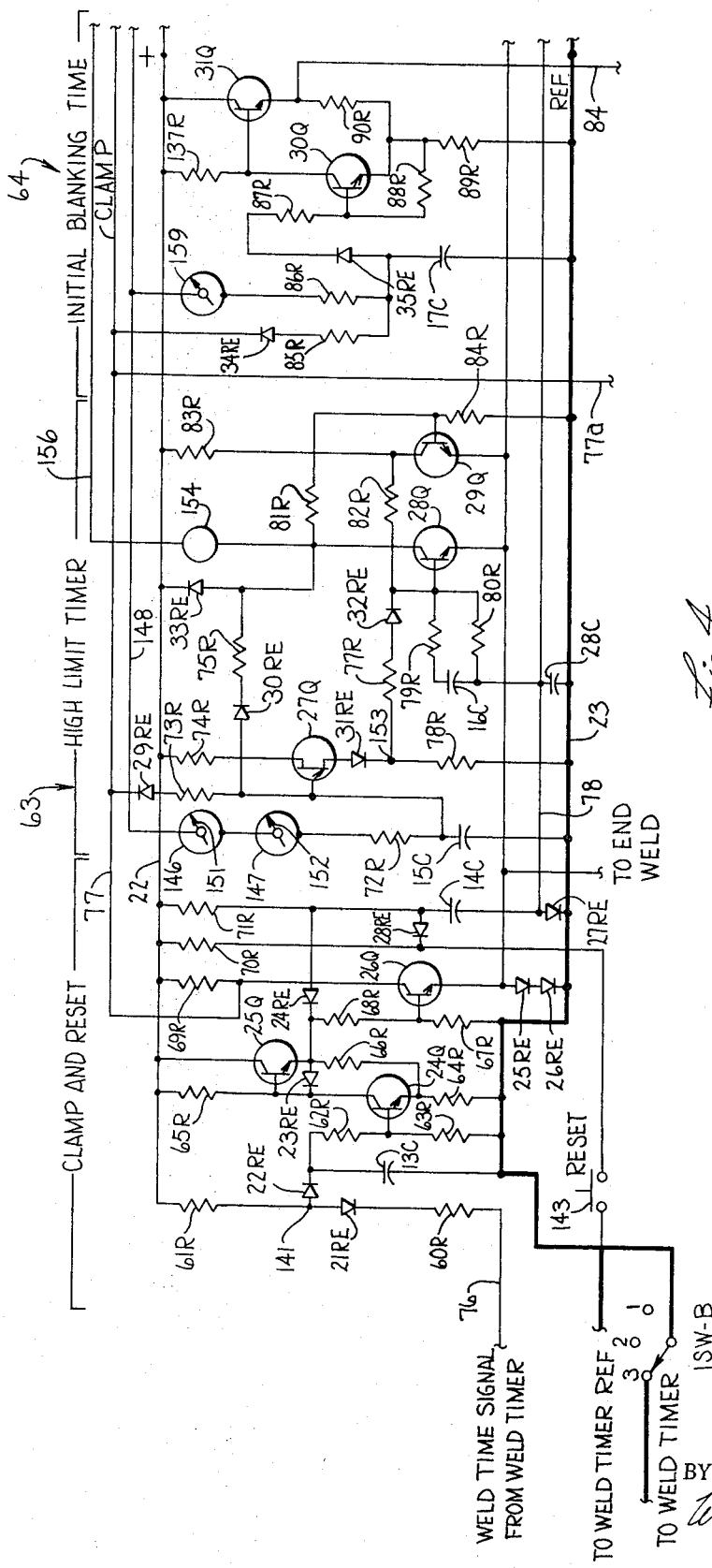
FIG. 4 is a schematic circuit diagram disclosing the high limit timer and initial blanking timers of the weld terminating unit of FIG. 1.

The synch circuit 43 comprises transistors 16Q and 17Q connected as a trigger circuit to produce a negative going synch pulse immediately following the 1/I pulse. Transistor 16Q is connected at its collector through a resistor 42R to the positive potential line 22 and at its emitter through a resistor 41R to the reference line 23. Transistor 17Q is connected at its collector directly to the positive potential line 22 and at its emitter through a resistor 43R and thence in series through the aforementioned resistor 41R to the reference line 23. A capacitor 10C is connected through at its upper end through a resistor 39R to the positive potential line 32 and at its lower end through a resistor 40R to the reference line 23. The base of normally nonconductive transistor 16Q connects between the capacitor 10C and resistor 14R. A clamping diode 10RE connects at its anode to the upper plate of capacitor 10C and at its cathode to the output line 41 of the R time base circuit 32. Thus, when the R time base flip-flop 14Q, 15Q resets at the end of the 1/I pulse, diode 10RE blocks and capacitor 10C charges through resistor 39R and the base of normally nonconductive transistor 16Q turning same on briefly. The resultant collector potential drop of transistor 16Q briefly blocks transistor 17Q, momentarily dropping the emitter potential thereof to form a negative going synch pulse which is taken from said emitter through the line 51 and applied to the end ratio detector 56 (FIG. 1).

R GENERATOR CIRCUIT 39

The R generator 39 (FIG. 3) provides an R pulse output for each weld current cycle following the initial blanking period, which R pulse is proportional in amplitude to the contemporaneous value of the weld contact resistance. The electrode voltage lines 46 and 47 (FIG. 1) connected across the welding electrodes 14 are bridged by a potentiometer 119 (FIG. 3). Lines 121 and 122 connect the armature 123 and one end of the potentiometer 119 to the primary winding 124 of a transformer 1T. The center tapped secondary winding 126 of transformer 1T is connected at its ends through diodes 11RE and 12RE to a common output point 127 to define a full wave rectifier. The center tap 128 of secondary winding 126 is connected intermediate the ends of a resistive voltage divider comprising series resistors 44R and 45R connected between the positive potential line 22 and reference line 23 for determining the voltage level of point 127 under conditions of zero electrode voltage. A small capacitor 25C connects the point 127 to an extension 23a of the reference line 23.

The R generator 39 further includes transistors 18Q and 19Q. Transistor 18Q connects at its collector through a series resistor 49R and diode 13RE to the full wave source line 24, the diode 13RE being oriented to pass current to said transistor. The emitter of transistor 18Q connects through regenerative resistor 47R to the reference line 23. Bias is applied to the base of transistor 18Q through a resistor 143R connected to the reference line 23. The rectified electrode voltage signal E is applied from the point 127 directly to the base of transistor 18Q.

Transistor 19Q is a PNP type and connects at its emitter through a regenerative resistor 50R to the full wave supply line 24. The collector thereof connects through a series diode 15RE storage capacitor 11C to the reference line 23. The diode 15RE is oriented to pass current from the collector of transistor 19Q to storage capacitor 11C. Transistors 18Q and 19Q are arranged so that the current output of the latter is proportional to instantaneous value of the full wave rectified electrode voltage signal E at point 127. Transistors 18Q and 19Q thus operate in a manner analogous to the aforementioned transistors 11Q and 12Q of the R time base circuit 32. Thus, transistor 19Q is capable of charging storage capacitor 11C at a rate proportional to the instantaneous value of the fully rectified electrode voltage signal E.

The collector of transistor 19Q connects through a clamping diode 14RE to the 1/l pulse line 42 from the R time base circuit 32 (FIG. 2) for normally clamping the anode of diode 15RE (FIG. 3) at a low potential to prevent charging of storage capacitor 11C therethrough. The peak pulse line 38 from the peak pulse circuit 31 (FIG. 2) connects to the upper plate of storage capacitor 11C (FIG. 3) for normally clamping same at a low potential except during the peak pulse lpp immediately following a weld current amplitude peak. Thus, storage capacitor 11C can support a charge only during the peak pulse lpp, is actually charged only during the 1/l pulse and is charged at a rate proportional to the instantaneous amplitude of the weld electrode voltage occuring during the charging time, whereby the maximum charge potential R across the storage capacitor 11C is proportional to the contact resistance across the welding position.

Transistors 20Q and 21Q are connected as a Darlington pair for reproducing the R pulse appearing on capacitor 11C with a small current supply capability and without discharging the capacitor 11C. The collectors of transistors 20Q and 21Q directly connect to the positive potential line 22. The base of transistor 20Q connects through a portion of the line 38 to the upper plate of capacitor 11C and the emitter thereof drives the base of transistor 21Q. The emitter of transistor 21Q is resistively connected to the reference line 23 by the end ratio output line 49 in series with means described hereinafter with respect to the end ratio detector 56 and the R pulse appearing on the emitter of transistor 21Q.

END RATIO DETECTOR 56

The end ratio detector 56 detects when the weld contact resistance has peaked and decreased to a lesser preselected value, the end ratio. The end ratio detector 56 comprises transistors 22Q and 23Q. Transistor 22Q is a unijunction transistor, the lower base of which is connected to the reference line 23 and the upper base of which is connected through an isolating diode 16RE to the output line 49 of the R generator 39. Diode 16RE is oriented for current flow from the output of the R generator to the upper base of the unijunction 22Q. A diode 19RE connects the synch line 51 to the upper base of unijunction 22Q and, in the absence of a synch pulse, applies a positive potential thereto.

A series resistor 51R and diode 20RE are connected between the positive potential line 22 and the reference line 23. The diode 20RE is oriented for conduction through said resistor to the reference line so that the anode thereof remains above reference potential. A voltage divider comprising a resistor 54R, a potentiometer 131 and a further resistor 55R connects between the emitter of R generator Darlington transistor 21Q and the anode of diode 20RE. The armature 132 of potentiometer 131, connects to the anode of diode 18RE and therethrough to the emitter of unijunction 22Q as well as to a storage capacitor 12C connected between the emitter of unijunction 22Q and the base of output transistor 23Q. The armature 132 is adjustable to apply a preselected amplitude fraction of the R pulse to the storage capacitor 12C.

The extension 77b of clamp line 77 from the clamp and reset circuit 74 (FIG. 1) connects through a resistor 56R (FIG. 3) to the cathode of a clamping diode 17RE and through said diode to a junction point 133 intermediate the emitter of unijunction 22Q and storage capacitor 12C. The low potential appearing on the clamping line 77b at times outside the weld interval prevents charging of the capacitor 12C.

End ratio output transistor 23Q is connected at its collector through a resistor 58R to the positive potential line 22 and at its emitter directly to the reference line 23. The base of transistor 23Q is normally biased for conduction by connection intermediate the ends of a resistive voltage divider comprising series resistors 57R and 59R. Said voltage divider is connected between the positive potential line 22 and the reference line 23.

Thus, the storage capacitor 12C charges to a maximum level corresponding to the peak of the contact resistance amplitude and holds that charge as the contact resistance amplitude diminishes during welding. During each synch pulse, the upper base of unijunction 22Q carries the R pulse output of the R generator 39. As the R pulses diminish in amplitude, following the diminishing contact resistance as the weld nugget forms, the end ratio is eventually reached whereat the unijunction 22Q fires, discharging the storage capacitor 12C therethrough to apply a negative going pulse to the base of transistor 23Q to block same. This results in a positive end ratio pulse on the collector of transistor 23Q. The end ratio line 57 connects to the collector of transistor 23Q and thus carries the end ratio pulse to the end weld circuit 59 and through the extension 57a to the low limit memory 71.

END WELD CIRCUIT 59

End weld circuit 59 comprises transistors 36Q through 39kQ and provides an end weld pulse to the weld timer 12 to terminate the weld interval. Normally conductive input transistor 36Q is connected at its collector through a resistor 111R to positive potential line 22 and at its emitter directly to a secondary reference line 136 from the clamp and reset circuit 74. The secondary reference line 136 is held by diodes, hereinafter described, at a constant potential slightly above that of the reference line 23. The DC bias level on the secondary reference line 136 is provided to insure the stability of the various clamps, timers and other circuitry connected thereto. Base bias is supplied to transistor 36Q through a resistor 109R connected to the reference line 23 whereby the base of said transistor normally maintained at a potential below that of its emitter to insure nonconduction in the absence of positive base inputs.

Three sources of positive inputs connect to the base of transistor 56Q. More particularly, the end ratio pulse line 57 connects through a resistor 110R to the base of transistor 36Q. Further, line 88 from the lockout timer 66 and line 87 from the low limit memory 71 connect to the base of transistor 36Q. Thus, a positive input from any one of these three circuits will render input transistor 36Q conductive.

Transistors 37Q and 38Q comprise a trigger circuit. Normally conductive transistor 37Q has its collector connected to the positive potential line 22 through a resistor 117R and its emitter connected through a resistor 118R to the reference line 23. Normally nonconductive transistor 38Q has its collector connected directly to positive potential line 22 and its emitter connected through a resistor 119R to the emitter of transistor 37Q and thence through aforementioned resistor 118R to the reference line 23. The base of transistor 38Q connects directly to the collector of transmitter 37Q. 37Q. Conductive base bias is applied to transistor 37Q by a series resistive voltage divider comprising a resistor 116R connected from the positive potential line 22 to the base of transistor 37Q, a resistor 114R connected from said base to the emitter of said transistor and the aforementioned resistor 114R. The base of transistor 37Q connects to a junction point 138 through a series resistor 115R and capacitor 20C. A resistor 113R connects the junction point 138 to the reference line 23. The capacitor 20C is fully chargeable through the resistors 116R, 115R and 113R in the absence of a positive potential on junction point 138.

A diode 41RE connects the junction point 138 to the collector of transistor 36Q and is oriented to apply positive collector potential to said junction point. The line 85 from the output of the low limit timer connects to the junction point 138 for applying a positive potential thereto prior to the end of the low limit time period. The junction point 138 is connected by a Zener diode 2ZE to the secondary reference line 136. The Zener 2ZE limits the voltage which may be applied at the junction point 138 to the lower plate of capacitor 20C to a value intermediate that of the secondary reference line 136 and the positive potential line 22, here to 7 volts above the secondary reference line 136, and thereby limits the charge on capacitor 20C when a positive potential is applied to junction point 138.

Thus, when one of the line 85 and collector of transistor 36Q is at a low potential, the drop of the other to a low potential causes capacitor 20C to transmit a negative going pulse to the base of transistor 37Q to block same and cause a high potential to appear on the emitter of transistor 38Q as the result of the consequent conduction thereof.

A feedback resistor 120R connects from the emitter of transistor 38Q back to the base of transistor 36Q to hold same conductive until capacitor 20C charges fully or until the low limit timer resets to again render line 85 positive, whichever occurs first.

The output transistor 39Q of the end weld circuit is connected at its collector directly to positive potential line 22 and at its emitter through a resistor 122R and series resistor 123R to the secondary reference line 136. The emitter of transistor 38Q connects the to base of transistor 39Q through a resistor 121R, the latter conducting in response to conduction of the former to provide the positive end weld pulse. Transistor 39Q is connected as an emitter follower. The end weld line 61 connects from an output point 139 intermediate emitter resistors 123R and 122R for coupling the end ratio pulse on the emitter of transistor 39Q to the weld timer 12 for ending the weld interval.

CLAMP AND RESET CIRCUIT 74

The clamp and reset circuit 74 provides clamp and reset signals to the remainder of the control 10 and includes transistors 24Q, 25Q and 26Q. Transistors 24Q and 25Q comprise a trigger circuit similar in operation and in circuitry to corresponding trigger circuits 30Q, 31Q and 32Q, 33Q hereinafter described with respect to the initial blanking timer 64 and low limit timer 67, respectively, and similar in basic circuitry and general operation to the trigger circuits 16Q, 17Q and 37Q, 38Q of the synch circuit 43 and end weld circuit 59, respectively, above described. In their rest condition, transistors 24Q and 25Q are respectively nonconductive and conductive. Transistor 24Q is connected at its collector through a resistor 65R to the positive potential line 22 and at its emitter through a resistor 64R to the reference line 23. Transistor 25Q is connected at its base to the collector of transistor 24Q, at its collector directly to the positive potential line 22 and at its emitter through a resistor 66R to the emitter of transistor 24Q. A diode 23RE connects the emitter of transistor 25Q to the collector of transistor 24Q to assist rapid switching of the trigger 24Q, 25Q to its energized state by conduction from said emitter to said collector. A voltage divider comprising series resistor 61R, diode 22RE, resistor 62R and resistor 63R is connected from the positive potential line 22 to the reference line 23. The base of transistor 24Q connects between the resistors 62R and 63R which, when the diode 22RE is conductive, drives transistor 24Q conductive. A filter capacitor 13C is connected in parallel with the resistors 62R and 63R to prevent application of transient voltages to the base of transistor 24Q. The weld interval signal line 76 from the weld timer 12 connects through a series resistor 60R and clamping diode 21RE to a point 141 between the resistor 61R and diode 22RE. The weld timer 12 normally applies a low, clamping potential through line 76, resistor 60R and diode 21RE to the anode of diode 22RE for blocking same and thereby blocking trigger transistor 24Q. During the weld interval, however, a high positive potential, the weld interval signal, appears on line 76 to unclamp the diode 22RE and allow it apply positive base drive to the trigger transistor 24Q for energizing the trigger circuit 24Q, 25Q.

The output of trigger circuit 24Q, 25Q appears on the emitter of transistor 25Q and controls the output on clamp line 77 and reset line 78.

More particularly, clamp transistor 26Q connects at its collector through a resistor 69R to the positive potential line 22 and at its emitter through a series pair of voltage dropping diodes 25RE and 26RE to the reference line 23. Base bias is supplied the transistor 26Q through a resistor 27R connected to the reference line 23. A signal resistor 68R connects the base of clamp transistor 26Q to the emitter of trigger output transistor 25Q for rendering the clamp transistor, the negative going potential appearing at the output of the trigger circuit 24Q, 25Q at the beginning of weld interval thus blocking clamp transistor 26Q and removing the low, clamping potential from the collector thereof. The collector of clamp transistor 26Q connects directly to the clamp line 77 and therethrough, as above described, to the several timers 63, 64, 67 and 68.

The reset portion of the clamp and reset circuit 74 comprises a resistor 71R connected from the positive potential line 22 through coupling capacitor 14C and diode 27RE in series to the reference line 23. Reset line 78 is connected between the lower end of capacitor 14C and diode 27RE. A capacitor 28C connects the reset line 78 to the reference line 23 for controlling switching transients on the reset line. A clamping diode 24RE connects the upper end of capacitor 14C to the emitter of trigger output transistor 25Q for dropping the potential thereof in response to the emitter potential drop of transistor 25Q at the beginning of the weld interval and for causing the capacitor 14C to apply a negative pulse to the reset line 78.

In addition, means are provided for manually energizing the reset line 78. More particularly, a manually closable reset switch 143 is connected at one terminal to the reference line 23 and at its other terminal through a resistor 70R to the positive potential line 22. A clamping diode 28RE is connected at its anode to the upper end of capacitor 14C and at its cathode intermediate the reset switch 143 and resistor 70R. Thus, closure of the switch 143 causes the clamping diode 28RE to clamp the upper plate of capacitor 14C to reference level and thus, in a manner analogous to the action of the diode 24RE above described, causes said capacitor to apply a negative going reset pulse to reset line 73.

The secondary reference line 136 is connected through the diodes 25RE and 26RE to the reference line 23.

HIGH LIMIT TIMER 63

The high limit timer 63 provides an alarm at the end of the high limit period and includes a unijunction transistor 27Q and a flip-flop circuit comprising transistors 28Q and 29Q. A series timing path comprising adjustable timing potentiometers 146 and 147, a fixed resistor 72R and a timing capacitor 15C is connected between a timing potential supply line 148 and the reference line 23. More particularly the armature 151 of timing potentiometer 146 connects to the timing supply line 148, the resistance winding thereof connects to the timing supply line 148, the resistance winding thereof connects in turn to the armature 152 of timing potentiometer 147 and the resistance winding of the latter connects to the fixed resistor 72R. The timing potential line 148 in the present embodiment connects directly to the positive potential line 22. The upper end of timing capacitor 15C connects to the emitter of unijunction 27Q and through a series resistor 73R and clamping diode 29RE to the clamp line 77 whereby the timing capacitor 15C is clamped, except during the weld interval, at a low potential insufficient to fire the unijunction 27Q.

The unijunction 27Q is connected at its upper base through a resistor 74R to the positive potential line 22 and at its lower base through a series diode 31RE and resistor 78R to the reference line 23, the diode 31RE being oriented to pass current from the unijunction to the reference line. The output of the unijunction 27Q is taken at a point 153 between said diode and resistor.

The flip-flop 28Q, 29Q is energizable by conduction of the unijunction 27Q at the end of the high limit interval for actuating an alarm relay coil 154. Normally blocked flip-flop transistor 28Q connects at its collector through relay coil 154 to a relay supply line 156. The line 156 is normally connected by a switch, hereinafter described, to the positive potential line 22. The emitter of flip-flop transistor 28Q connects to the secondary reference line 136. Normally conductive flip-flop transistor 29Q is connected at its collector through a resistor 83R to the positive potential line 22 and at its emitter directly to the secondary reference line 136. The base of flip-flop transistor 28Q connects through a resistor 82R to the collector of flip-flop transistor 29Q. The base of flip-flop transistor 29Q connects to the collector of flip-flop transistor 28Q through a resistor 81R. Base bias is applied to flip-flop transistor 59Q through a resistor 84R connected to the reference line 23. The base of flip-flop transistor 28Q is connected to the reset line 78 through a network comprising a series capacitor 16C and resistor 79R, both paralleled by a further resistor 88R whereby a negative pulse on the reset line 78 will reset the flip-flop 28, 29Q to its normal state.

Firing of the unijunction 27Q causes conduction of flip-flop transistor 28Q by means of series resistor 77R and diode 32RE connected from the unijunction output point 153 to the base of flip-flop transistor 28Q. A series clamping diode 30RE and resistor 75R connect between the upper plate of capacitor 15C and the collector of transistor 28Q whereby conduction of said transistor 28Q prevents recharging of the timing capacitor 15C. A diode 33RE connects at its anode to the collector of transistor 28Q and at its emitter to the positive potential line 22 to prevent a rise in collector potential above the potential of positive line 22 due to transients generated by the relay coil 154.

INITIAL BLANKING TIMER 64

The initial blanking timer 64 holds the peak pulse circuit 31 inoperative except during the portion of the weld interval following the initial blanking period and comprises a trigger circuit incorporating transistors 30Q and 31Q. A timing line comprising a timing potentiometer 159, a fixed resistor 86R and a timing capacitor 17C, all in series, extends between the timing potential line 148 and the reference line 23. The timing potentiometer 159 connects at its armature 161 to said timing potential line 148 and the winding thereof connects to said resistor 86R. The upper end of timing capacitor 17C connects through a series resistor 85R and clamping diode 34RE to the clamp line 77 for holding the timing capacitor discharged except during the weld interval. The upper end of capacitor 17C is also connected through a series diode 35RE and resistor 87R to the base of normally blocked transistor 30Q for rendering same conductive at the end of the initial blanking period due to a sufficient charge on said timing capacitor.

Transistor 30Q is connected at its collector through a resistor 137R to the positive potential line 22 and at its emitter through a resistor 89R to the reference line 23. The emitter-base junction of transistor 30Q is shunted by a relatively large resistor 88R. The transistor 31Q connects at its collector directly to the positive potential line 22 and at its emitter through a resistor 90R to the emitter of transistor 30Q. Output is taken from the emitter of normally conductive transistor 31Q on the initial blanking line 84 connected thereto.

LOW LIMIT TIMER 67

The low limit timer 67 provides outputs to the end weld and low limit memory circuits 59 and 71, respectively, at the end of the low limit period. The low limit timer 67 is similar in circuitry to the initial blanking timer 64 differing therefrom only in the clamping and timing circuitry associated with its timing capacitor. Thus, the low limit timer comprises a trigger circuit including transistors 32Q and 33Q and associated resistors 93R—97R, timing capacitor 18C and diode 37RE corresponding to and interconnected and connected to lines 22, 136 and 23 in the same way as transistors 30Q, 31Q, resistors 87R—90R and 137R, timing capacitor 17C and diode 35RE, respectively, of the initial blanking timer 64 above described. Thus, further description of said corresponding parts of trigger 32Q, 33Q is not believed required.

With respect to the clamping and timing current supply circuitry of the low limit timer, timing current is supplied to the upper plate of timing capacitor 18C through a series resistive line comprising timing potentiometers 162 and 163, fixed resistor 92R and further fixed resistor 91R. The armature 164 of potentiometer 162 connects to the timing potential line 148, the armature 165 of potentiometer 163 connects to the resistive element of potentiometer 162 and the resistive element of potentiometer 163 connects to aforementioned resistor 92R.

The clamping line 77 connects to the cathode of a clamping diode 36RE and therethrough to a point between resistors 91R and 92R to prevent charging of timing capacitor 18C to a level sufficient to activate the trigger circuit 32Q, 33Q, except during the weld interval.

Considering the output circuitry of trigger circuit 32Q, 33Q, the emitter of transistor 33Q connects to the secondary reference line 136 through a resistive voltage divider comprising series resistors 99R and 100R. The output of the low limit timer is taken from a point intermediate said resistors from which an isolating diode 42RE connects to the low limit line 85 for conduction of current to the end weld circuit 59. Output is also taken from the emitter of trigger output transistor 33Q through the output line 86 to the low limit memory circuit 71.

LOW LIMIT MEMORY CIRCUIT 71

The low limit memory circuit 71 (FIG. 5) energizes an alarm and the end weld circuit in response to an end ratio condition occuring during the low limit period and comprises transistors 34Q and 35Q connected as a flip-flop circuit. Two inputs are applied to the low limit memory flip-flop 34Q, 35Q. More particularly, the low limit line 86 connects through a series resistor 98, diode 39RE and resistor 101R to the base of normally blocked flip-flop transistor 34Q. The diode 39RE is oriented to pass current from the low limit timer toward the flip-flop transistor 34Q when the low limit output transistor 33Q conducts prior to the end of the low limit period. However, as the second input, the end ratio line 57a from the end ratio detector 56 connects through a clamping diode 38RE to the diode 39RE, said diodes being arranged anode to anode, for preventing the low limit timer for firing the flip-flop transistor 34Q except upon occurrence of an end ratio pulse during the low limit period.

The remainder of the flip-flop 34Q, 35Q is similar to the flip-flop 28Q, 29Q described above with respect to the high limit timer 63, the transistors 34Q and 35Q, resistors 102R—106R and 108R, capacitor 19C, diode 40RE and alarm energizing relay coil 167 of the low limit memory flip-flop 34Q, 35Q corresponding to and being connected to each other and to the lines 156, 22, 136, 78 and 23 in the same manner as the transistors 28Q and 29Q, resistors 79R—84R, capacitor 14C, diode 33RE and relay coil 154, respectively, of the high limit flip-flop 28Q, 29Q. Thus, further description of said corresponding parts in flip-flop 34Q, 35Q is not believed required.

A positive output is taken from the collector of transistor 35Q through a resistor 107R and, thence, through the low limit memory line 87 to the end weld circuit, upon energization of the flip-flop 34Q, 35Q in response to an end ratio pulse during the low limit interval.

LOCKOUT TIMER 68

The lockout timer 68 energizes an alarm and the end weld circuit at the end of the lockout period if an end ratio condition has not been previously reached. The lockout timer comprises a unijunction transistor 40Q and a flip-flop circuit comprising transistors 41Q and 42Q. The circuitry of the lockout timer 68 is similar to that of the high limit timer 63. More particularly, the unijunction 40Q, transistors 41Q and 42Q, resistors 125—135R and 137R, diodes 43RE—47RE, timing potentiometers 171 and 172, capacitors 21C and 22C and alarm relay coil 176 of the lockout timer 68 correspond to and are connected to each other and to the lines 22, 23, 77, 78, 136, 148 and 156 in the same manner as the unijunction 27Q, transistors 28Q and 29Q, resistors 73R—75R and 77R—84R, diodes 29RE—33RE, potentiometers 146 and 147, capacitors 15C and 16C and relay coil 154, respectively, of the high limit timer 63. Further description of such corresponding parts of these two timing circuits is thus not believed required.

In addition, a resistor 136R is connected to the collector of flip-flop transistor 42Q to provide a positive potential, at the end of lockout period, through line 88 to the end weld circuit 59 to terminate the weld interval if the weld interval has not already been terminated by an end ratio condition. In the event that the weld time is terminated before timing out of the lockout timer, the clamp line 77 discharges the timing capacitor 21C to prevent output from the lockout timer.

Figure 5:
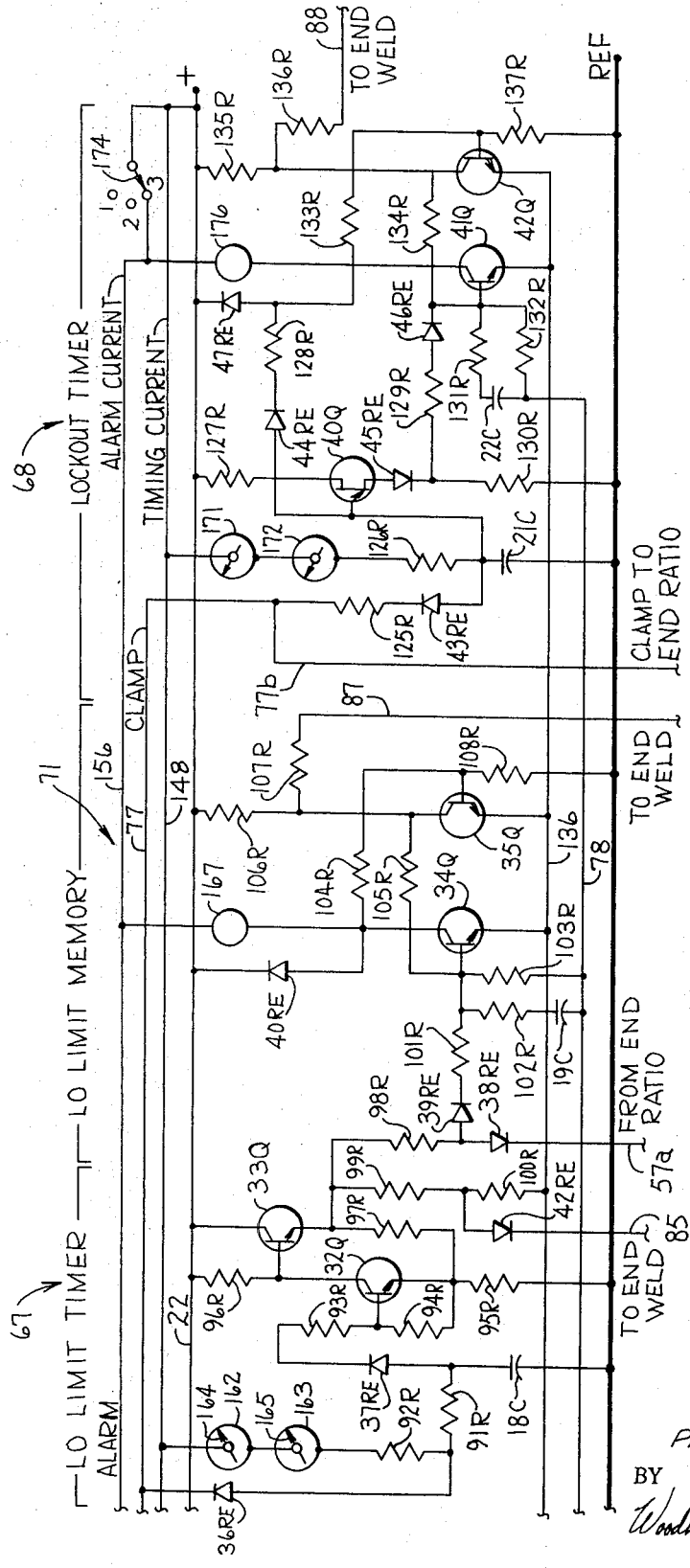
FIG. 5 is a schematic circuit diagram disclosing the low limit timer and memory and lockout timer portions of the weld terminating unit of FIG. 1.

FIG. 5 further discloses the connection of the line 77b to be the clamp line 77 adjacent resistor 125R of the lockout timer and a manually actuable switch 174 for connecting the alarm relay current line 156 to the positive potential line 22.

ALARM UNIT 72 AND POWER SUPPLY 21

Connected across a pair of AC source lines 178 and 179 are preferably identical alarm circuits 181—183 responsive to timing out of the low limit timer 67, the high limit timer 63 and the lockout timer 68, respectively. The low limit alarm circuit 181 comprises an alarm lamp 184 connected in series with a normally open contact 167a of the low limit relay 167 between the AC source lines 178 and 179. A resistor 160R parallels the lamp 185. Preferably identical alarm circuit 182 comprises a corresponding lamp 185, normally open contact 154a of high limit relay 154 and resistor 161R. Preferably identical alarm circuit 183 comprises a corresponding lamp 186, normally open relay contact 176a of lockout relay 176 and resistor 162R.

Low limit counter and high limit counter circuits 187 and 188 are connected across the AC source lines 178 and 179. More particularly, low limit counter circuit 187 comprises a low limit counter 189 of any convenient type in series with a further normally open relay contact 167b of low limit relay 167 between the AC source lines of 178 and 179. The counter 189 is paralleled by a series resistor 163R and capacitor 160C. Preferably identical high limit counter circuit 188 comprises a corresponding counter 190, relay contact 154b of high limit relay 154, resistor 164R and capacitor 161C.

AC source lines 178 and 179 are connected to the ends of the primary winding 191 of a main power transformer 192. The secondary winding 193 of the main power transformer connect at its ends through diodes 48RE and 49RE to and through a resistor 138R to the high level input of a filter and voltage regulating circuit 194 of any convenient type as well as to the full wave, unfiltered supply line 124. The center tap 195 of the secondary winding 193 connects through the reference line 23 to and through the filter and voltage regulating circuit 194. The filter and voltage regulating circuit 194 provides a constant positive DC output on the positive line 22.

OPERATION

Although the operation of this invention has been indicated somewhat above, the same will now be described in detail to insure a complete understanding of the invention.

FIG. 8 discloses the change of the weld contact resistance with time at the welding position during a weld. From the time $t_o$ at which weld current is started until a time $t_1$, the contact resistance is unstable. Thereafter, it rises to a peak value at time $t_2$ and then falls at a generally uniform rate. It has been found that the fall of the contact resistance is a reliable indicator of weld nugget formation.

More particularly, there is a high degree of probability that a good weld will have been made if the weld current is terminated when the contact resistance has fallen to a preset fraction of its peak value, the end ratio. Further, it is desirable that the end ratio occur within a particular time range $t_4—t_8$ after the resistance peak inasmuch as too rapid or too slow a rate of resistance drop may result in inferior welds due to excessive or insufficient heat and, in addition, too slow a resistance drop may not permit completion of a weld within the production schedule.

RESISTANCE SENSING UNIT 18

The weld contact resistance sensing unit 18 provides, by particularly advantageous method and means, the first broad requirement of the control 10, that is, a signal R proportional to the instantaneous weld contact resistance.

INTEGRATOR-AMPLIFIER CIRCUIT 28

In order to derive a reliable weld contact resistance signal R, it is necessary to have a signal waveform (I) proportional to the weld current waveform. To this end, the air core sensing coil 26 is placed at a convenient location in the field treated by the secondary current of the welding machine. Since the coupling is through air, the output of the coil 26 is proportional to the rate of change of weld current ($dI/dt$) as shown in FIG. 7a. The high gain amplifier 1Q—6Q greatly amplifies any signal applied to the base of transistor 1Q as in output on the emitter of transistor 6Q and, due to circuit phasing, the output will be inverted in sign (180° out of phase) with respect to the input. Further, since transistors 1Q and 2Q are connected as a double emitter follower, the base of transistor 1Q will draw negligible current from the signal source. The input signal is applied to the amplifier 1Q—6Q from the air core coil 26 through series resistors 1R and 2R and appears at the base 106 of transistor 1Q.

An input signal voltage appearing at the base 106 of transistor 1Q appears at the emitter of transistor 2Q. This voltage signal is reproduced with high linearity at the collector of transistor 3Q from which sufficient current may be drawn (without requiring significant current at the base of transistor 1Q) for driving amplifier transistor 5Q. The output of transistor 5Q is taken from its collector, inverted in sign, appreciably amplified in magnitude and applied to emitter follower output transistor 6Q, appearing at the emitter thereof and hence on output line 34.

The amplifier 1Q—6Q has extremely high gain and the input terminal 106 thereof must therefore be very near signal ground, that is, the potential on the cathode of Zener 1ZE, if the amplifier is to operate properly since, due to its high gain, an appreciably large input signal would drive the amplifier beyond its limits.

Given the above considerations, there is therefore a current in the signal feedback path through capacitor 1C from the amplifier output to its input equal to and opposite in sign to the current created by the air core coil output signal applied to input resistors 1R and 2R. More particularly, any current created in these input resistors must flow on through the feedback capacitor 1C to the output terminal of the amplifier since the amplifier itself can draw no current without exceeding its linear range. Thus, a positive going signal appearing to the input resistors causes the amplifier to produce a negative going output which draws current through the feedback capacitor 1C, which current must equal the input current during linear operation of the amplifier.

Since the input signal applied by the air core coil 26 to the input 106 of the amplifier is proportional to the time rate of change of the weld current ($dI/dt$) and since the input path of the amplifier is resistive, the current in the input path is necessarily proportional to $dI/dt$). The feedback path through capacitor 1C is capacitive and therefore the feedback current therethrough will be the output voltage applied to the capacitor, i.e., $dV_o/dt$, where $V_o$ is the amplifier output voltage. Restated mathematically, $$dI/dt = \frac{1}{C} dV_o/dt \text{ or } V_o \alpha I$$

Thus, the output signal I (FIG. 7b) from the amplifier is proportional to the welding current.

In order to gain long term stability, resistors 5R and 8R and capacitor 2C form a DC feedback path to reduce the gain of the amplifier for DC conditions and to establish a stable operating point. The resting voltage for the output line 34 of the amplifier is approximately that of Zener 1ZE which, in the particular embodiment shown, is approximately 12 volts.

PEAK PULSE CIRCUIT 31

The peak pulse circuit 31 provides the peak pulse Ipp (FIGS. 7c and 1) by switching at one peak of the weld current waveform in each current cycle, when the weld current waveform amplitude is unchanging, that is, when $dI/dt$ is zero. It is at this point in the weld current waveform that the weld resistance is measured so since it is at this point that the electrode voltage E may be accurately read without error due to unintended pickup of a $dI/dt$ signal on the electrode voltage sensing lines 121 and 122.

The weld current signal I on the output line 34 of the integrator-amplifier 28 is applied to the base of transistor 7Q through capacitor 4C. As long as the current signal I is increasing, said capacitor will be charged and the charging current therethrough will flow in the base of transistor 7Q to hold same conducting. At the peak amplitude point of the weld current waveform, the current signal I is no longer increasing whereby charging current no longer flows in capacitor 4C. As a result, transistor 7Q blocks and no longer shunts the base-emitter junction of transistor 8Q. Thus, the current signal I on line 34 is applied through resistor 14R and diode 3RE to the base of transistor 8Q at and following the peak in the weld current waveform to render the transistor 8Q conductive. Transistor 8Q remains conductive for the duration of the positive half cycle weld current signal I waveform. When the current signal I swings negative, transistor 8Q will return to its normal blocked condition.

The one shot circuit 9Q, 10Q is arranged so that at all times in a weld current signal I cycle, except during the brief period at and following the positive peak, transistor 9Q conducts to clamp the line 38 to the R generator 39 at a low potential to prevent operation thereof. When transistor 8Q begins conduction at the peak of the weld current waveform, the resulting drop in potential on the collector thereof is coupled as a negative going pulse through capacitor 6C to the base of one shot transistor 9Q, causing same to block and hence causing one shot transistor 10Q to conduct. Transistor 10Q continues to conduct until either capacitor 10C becomes charged by the base current in transistor 10Q or until transistor 8Q blocks and renders transistor 9Q again conductive. It is immaterial whether the one shot circuit 9Q, 10Q times itself out by full charging the capacitor 7C or is reset by blocking of transistor 8Q as long as the duration of blocking of transistor 9Q is greater than 1 millisecond, which it will be in either case.

The positive pulse Ipp appears on the collector of transistor 9Q when it blocks at the peak of the weld current waveform, and is applied through diode 50RE the peak pulse line 38 to the R generator 39, removing the clamp therefrom. Also at the peak of the positive weld current signal I half cycle, the unblocking of transistor 10Q causes a negative going potential to appear on its collector which is applied through line 37 and capacitor 26C to the R time base circuit 32 hereinafter described.

The above operation of the peak pulse circuit 31 applies between the end of the initial blanking period of the weld interval and the end of the weld interval. At all other times including the initial blanking period, during which the weld contact resistance is subject to instabilities, it is desired to prevent the R generator 39 from operating and from producing its R signal output. To this end, at all times except during the portion of the weld interval following the initial blanking period, the initial blanking timer 64 applies positive potential through line 84, resistor 15R and diode 4RE to the base of transistor 8Q for maintaining same continuously conductive. This prevents switching of the transistor 8Q at the positive peak of the I signal waveform and hence prevents same from passing negative pulses to the base of transistor 9Q. As a result, during the initial blanking period of the weld time and at all nonweld times transistor 9Q continuously conducts clamping current through the line 38 from the R generator thereby maintaining the latter disabled.

R TIME BASE CIRCUIT 32

The R time base circuit 32 generates a positive pulse 1/I (FIG. 7d) of width inversely proportional to weld current peak amplitude. One such 1/I pulse is generated in each weld current cycle and begins, concurrently with the peak pulse Ipp, at the amplitude peak of the positive I signal halfwave.

Transistor 11Q is driven through line 35 by the current signal I from the output of the integrator-amplifier 28. Because of the degenerative action of resistor 27R, the collector current of transistor 11Q is proportional to the weld current, transistor 11Q conducting during positive going half cycles only of the I signal waveform. The collector current in transistor 11Q creates a voltage drop across resistor 25R which is also proportional to weld current, so that the collector potential of transistor 11Q drops to its lowest value at the peak amplitude of the positive I signal halfwave. Base drive is supplied to PNP transistor 12Q from the collector of transistor 11Q. Due to the degenerative action of resistor 26R, the collector current of transistor 12Q is also proportional to the weld current, transistor 12Q conducting during positive I signal halfwaves only.

Normally conductive flip-flop transistor 14Q normally shunts the collector current of said transistor 12Q to the reference line 23 through clamping diode 9RE and series resistor 30R thereby preventing transistor 12Q from charging the capacitor 8C.

However, at the peak of the positive I signal half cycle, one shot transistor 10Q of the peak pulse circuit becomes conductive whereby a low potential appears on its collector and is coupled as a negative pulse through capacitor 26C and resistor 31R to the base of flip-flop transistor 14Q causing same to block and hence causing flip-flop transistor 15Q to conduct. With transistor 14Q nonconductive, it no longer shunts the capacitor 8C through diode 9RE and resistor 30R. As a result, the collector current of transistor 12Q charges the capacitor 8C at a rate proportional to the weld current amplitude, until its charge level is sufficient to fire the unijunction 13Q. The firing of unijunction 13Q discharges capacitor 8C therethrough to couple a negative pulse through capacitor 9C and resistor 38R to the base of transistor 15Q to block same and reset the flip-flop 14Q, 15Q. Thus, transistor 14Q is restored to conduction, dropping the collector potential thereof and terminating the 1/I pulse.

Considering in more detail the time duration of the positive 1/I pulse, that is, the charging time of capacitor 8C, such time is constrained to be relatively short so that charging will occur only while the current signal I is not changing appreciably in amplitude whereby the charging current of capacitor 8C, i.e., the collector current of transistor 12Q, may be assumed constant and proportional to the weld current peak amplitude.

The formula for charging a capacitor with a constant current is:

$CV = it$ where C, the capacitance and V, the emitter voltage for firing the unijunction 13Q are constants and $i$, the charging current and $t$, the charge time are variables. The above expression may be rewritten:

$t = CV/i$.

But $i$ is proportional to weld current, i.e., $i = k_o I_w$ where $I_w$ is the welding current and $k_o$ is a constant of proportionality. Thus, $t = CV/k_o I_w$ or, $t = k_1/I_w$ where $k_1$ is another constant equal to $CV/k_o$. Thus, the width of the positive 1/I pulse appearing on the collector 14Q is inversely proportional to the weld current peak amplitude. In the particular embodiment of the invention shown, the working range of this pulse width is from approximately 100 to 400 microseconds.

With the production of the current signal I by the integrator-amplifier circuit 28 and the production of the 1/I pulse by the R time base circuit 32 discussed above, attention is directed briefly to the interrelated functions of the calibrating resistors 1CL and 2CL of the former and latter circuits, respectively. Adjustment of the first calibration resistor 1CL established the DC level of the integrator output, or current signal I (with respect to the cathode of Zener 1ZE), so that conduction of transistor 11Q of the R time base circuit is impending when the current signal I is zero. The second calibration is carried out by setting of the calibration resistor 2CL which establishes the relation between the current signal I and the charging current for capacitor 8C, thus relating the duration of the 1/I pulse to the current signal I. These calibrations offset the effects of base emitter voltage drops and other small nonlinearities in the transistors. The purpose of the calibration is not a precise matching of a particular current signal I level to a particular pulse width. In a particular embodiment, for example, a 10 volt current signal I might produce a pulse width anywhere in the particular range 100 plus or minus 10 microseconds and be perfectly acceptable. Rather, the purpose of these calibrations is to insure that the width of 1/I pulse is maintained inversely proportional to the magnitude of the current signal I over the usable or working range of the circuit, for example 1/I pulse widths of from 100 to 400 microseconds.

One output of the R time base circuit appears on the collector of transistor 14Q and is coupled by line 42 to the R generator 39. More particularly, the line 42 is normally clamped by conduction of transistor 14Q. This clamp is removed while the positive 1/I pulse appears on the collector of blocked transistor 14Q.

The other output of the R time base circuit appears on the collector of transistor 50Q and consists of a negative going pulse corresponding in time to the positive 1/I pulse and applied through line 41 to the synch circuit 43.

Since the R time base flip-flop 14Q, 15Q is energized by the one shot circuit 9Q, 10Q of the peak pulse circuit 31, the R time base circuit cannot generate 1/I pulses to remove the clamp on the line 42 to the R generator 39 nor can it provide negative pulses to the synch circuit 43 at times other than the portion of the weld interval following the initial blanking period.

SYNCH CIRCUIT 43

The output of the synch circuit 43 appearing on synch line 51 is a series of negative going pulse (FIG. 7h) each beginning at the time of the maximum amplitude point of an R pulse from the R generator 39 and being of lesser duration than such R pulse. More particularly, synch transistor 16Q is normally blocking for lack of base drive due to the normal charged condition of capacitor 10C. During the 1/I pulse flip-flop transistor 15Q draws current through diode 10RE from the resistor 39R to clamp the upper plate of capacitor 10C at a relatively low level and hence to discharge said capacitor. At the end of the 1/I pulse, the collector of transistor 15Q again swings positive and causes the diode 10RE to block whereby the upper plate of capacitor 10C assumes a high potential due to its connection through resistor 39R to the positive potential line 22. The lower plate of said capacitor follows the upper plate and applies a positive potential to the base of transistor 16Q causing same to conduct. Thereafter, the capacitor 10C charges through resistors 39R and 40R and the base potential on transistor 16Q diminishes blocking transistor 16Q after a time determined by the RC time constant of said resistors and capacitor. Thus, at the end of the 1/I pulse, a positive pulse appears on the base of transistor 16Q for rendering same briefly conductive.

The resulting low collector voltage of transistor 16Q is reproduced at the emitter of transistor 17Q as a negative synch pulse which is applied through line 51 to the end ratio detector 56.

R GENERATOR 39

The R generator 39 produces R pulses (FIGS. 7g and m) of amplitude proportional to the instantaneous weld contact resistance. The electrode voltage appearing across the welding electrodes 14 is applied across electrode voltage lines 46 and 47. A spurious $dI/dt$ signal (similar to FIG. 7a) normally is superimposed on the electrode voltage waveform on lines 46 and 47 due to inductive pickup from the weld transformer secondary circuit. An electrode voltage signal E (FIG. 7e) proportional to this composite voltage on lines 46 and 47 is applied by the potentiometer 119 (FIG. 3) to lines 121 and 122 and therethrough to the primary of transformer 1T. The signal E is full wave rectified by diodes 11RE and 12RE and applied through junction point 127 to the base of transistor 18Q. Transistors 18Q and 19Q operate at a manner similar to transistors 11Q and 12 above-described whereby the collector current in transistor 19Q is directly proportional to the full wave rectified signal E (FIG. 7f).

Normally the collector current of transistor 19Q is shunted to the reference line 23 through two parallel paths to prevent its charging the capacitor 11C and to maintain capacitor 11C in a discharged state. More particularly, the collector current of transistor 19Q is shunted to reference line 23 through the diode 14RE, 1/I line 42 and R time base flip-flop transistor 14Q. The capacitor 11C is normally held discharged through the diode 15RE, peak pulse line 38 and collector of normally conductive one shot transistor 9Q.

At the peak of the positive I signal half cycle the positive peak $I_{pp}$ appears on the collector of one shot transistor 9Q and removes the clamp normally applied to the upper plate of capacitor 11C to ready same for charging. The clamp applied to the anode of diode 15RE is removed when R time base flip-flop transistor 14Q blocks at the peak of the positive I signal half cycle. The diode 15RE remains unclamped for the period of the 1/I pulse, that is, for a timer inversely proportional to the peak amplitude of the weld current in that cycle. The period of during which the upper plate of capacitor 11C remains unclamped exceeds the maximum possible duration of the 1/I pulse. The collector current of transistor 19Q then passes through diode 15RE and capacitor 11C to charge the latter at a rate determined by said collector current.

At the weld current peak amplitude, $dI/dt$ is zero and the signal E at such time, as indicated at $E_T$ in FIGS. 7e and f, and therefore, the charging current in capacitor 11C, is proportional to the true electrode voltage peak amplitude. Since the maximum duration of the 1/I pulse is very short, the rate of charging of the capacitor 11C remains at least substantially proportional to the true electrode voltage peak amplitude throughout the charging time thereof. The capacitor 11C is thus charged, at the weld current peak, at a rate proportional to the electrode voltage peak magnitude and for a time inversely proportional to the weld current peak amplitude.

The formula for charging a capacitor is:

$Cv=it$

Where C, the capacitance is a constant, $v$ is the voltage on the capacitor, $i$ is the charge current and $t$ is the charge time, $v$, $i$ and $t$ being variables. The above expression may be written $v=it/C$ but since the charge current $i$ is proportional to the welding electrode voltage $E_w$, $i=k_4 E_w$, where $k_4$ is proportionality constant, and:

$t=k_1/I$ where $k_1$ is a proportionality constant, it must be true that at the time that transistor 14Q again conducts to stop the charging of capacitor 11C, $v=(k_4 E k_1)/IC$ or $v=k_2\theta_x=(k_4 k_1)/C$ Thus, by Ohms' Law, $v=k_2 R$, showing that the voltage to which the capacitor is charge is proportional to the weld contact resistance R.

When the R time base flip-flop transistor 14Q begins conduction again at the end of its 1/I pulse, the diode 15RE is again blocked by the resulting low clamping potential applied to its anode through the diode 14RE, line 42 and transistor 14Q. However, the capacitor 11C carrying the resistance signal R as the charge potential thereacross does not at this time discharge since the positive peak pulse Ipp has not yet terminated. The resistance signal R thus remains stored on capacitor 11C and is applied to the Darlington pair 20Q, 21Q, appearing at the emitter of Darlington transistor 21Q. The Darlington pair 20Q and 21Q applies the R signal with a small current capability to the end ratio detector 56 without discharging the storage capacitor 11C.

After a delay of at least 1 millisecond, the peak pulse one shot transistor 9Q resumes conduction, terminating the positive peak pulse Ipp and once again clamping the upper plate of storage capacitor 11C to the reference potential through the line 38 and clamping diode 50RE to return said storage capacitor to its normal discharged state. The width of the R pulse appearing on the emitter of Darlington transistor 21Q is thus at least 1 millisecond and will be longer where the width of the 1/I is less than its maximum.

Thus, an R pulse appears at the emitter of Darlington transistor 21Q once in each cycle of the welding current between the end of the initial blanking period and the end of the weld interval and lags the positive I signal amplitude peak by a very short time interval equal to the width of the 1/I pulse.

WELD TERMINATING UNIT 19

END RATIO DETECTOR 56

The end ratio detector 56 detects the fact that the weld constant resistance, and hence the value of the R signal, has reached a peak value and decreased from that peak over a number of cycles of weld current to a lesser value, that is, to that fraction of its peak value selected as the end ratio.

Normally nonconductive unijunction transistor 22Q requires a predetermined relationship between the potentials on its upper base and its emitter before it will conduct. As shown in FIG. 7o, the upper base of unijunction 22Q is normally held at a high potential and, when at this high potential, the unijunction will not conduct regardless of the potential which the associated circuitry can apply to its emitter. More particularly, normally conductive synch transistor 17Q applies, through a line 51 and diode 19RE, a normally high potential to the upper base of unijunction transistor 22Q. This high potential is removed once in each cycle of welding current between the end of the initial blanking period and the end of the weld interval by the appearance of the negative going synch pulse on line 51 which occurs as above mentioned when the R pulse is fully established. The negative synch pulse on line 51 blocks the diode 19RE. As a result, the simultaneously occurring R pulse at the emitter of Darlington transistor 21Q, applied to the upper base unijunction 22Q through diode 16RE, determines the potential on said base during a synch pulse. Thus, the upper base of unijunction 22Q will, during a synch pulse, be at a relatively high potential when the weld contact resistance is at its peak value and will be at a lower potential when the weld contact resistance has decreased from its peak value.

If the unijunction 22Q is ever to fire it will be during the synch pulse of the weld current cycle during which the weld contact resistance has dropped from its peak value to the end ratio.

The R pulses on the emitter of Darlington transistor 21Q are also applied to the series line comprising resistor 54R, potentiometer 131, resistor 55R and conductive diode 20RE whereby a constant fraction of the amplitude of each R pulse, determined by the setting of the armature 132 of potentiometer 131, is applied through diode 18RE to the R peak storage capacitor 12C for charging same to said fractional level through the resistor 59R, DC power supply and transistor 21Q. Thus, as the weld contact resistance rises in the early part of the weld interval following the initial blanking period, a preselected fraction of each corresponding R pulse is applied to the R peak storage capacitor 12C, raising the charge level thereof. After the weld contact resistance has peaked and begins to decline, the value stored in the R peak storage capacitor 12C remains constant at the preselected fractional value of the R pulse amplitude corresponding to the weld contact resistance peak.

The potential (FIG 7n) seen by the emitter of unijunction 22Q is the charge potential appearing on the storage capacitor 12C. The circuit parameters are such that the unijunction 22Q will never fire until the weld contact resistance has declined from its peak value to the end ratio, at which time the corresponding R pulse amplitude applied to the upper base of unijunction 22Q during a synch pulse is low enough to allow the capacitor 12C to fire the unijunction 22Q.

Examining this circuit quantitatively, the condition for firing a unijunction is:

$ve=nVb_2$ where $Ve$ is the emitter voltage, $n$ is the intrinsic standoff ratio of the unijunction (a constant) and $Vb_2$ is the voltage applied to the upper base of the unijunction. Considering the emitter voltage desired for firing the unijunction, $Ve=K_3 R_p$ where $K_3$ is the setting of potentiometer 131 (a constant for any particular weld) and $R_p$ is the highest value reached by R during the weld interval. Considering the value of the upper base potential required for firing, $Vb_2=R$.

Therefore, the condition for firing unijunction 22Q becomes:

$K_3 R_p \rho R$ and $R=(K_{3p})/n$ indicating that the unijunction 22Q will fire after R has peaked and decreased by a fixed percentage depending upon the setting of potentiometer 131. The calibration of the present embodiment is such that the percentage decrease is adjustable from approximately 12 percent to 45 percent drop in R to fire the unijunction 22Q.

Firing of the unijunction 22Q couples a negative going pulse through storage capacitor 12C to the base of normally conductive transistor 23Q to cause same to block momentarily and thereby create a positive going pulse on the collector thereof, such positive going pulse, the R pulse, being applied to the output lines 57 and 57a of the end ratio detector 56 leading to the end weld circuit 59 and to the low limit memory circuit 71, respectively.

It will be noted that unijunction 22Q cannot be fired if the storage capacitor 12C remains uncharged. Thus, to prevent any possibility of false firing of the unijunction 22Q and, hence, of a false end ratio pulse output, the emitter side of storage capacitor 12C is clamped at low potential through clamping diodes 17RE, resistor 56R and the clamping line 77b from the clamp and reset circuit 74 at all times outside the weld interval, this low potential clamp being removed by the clamp and reset circuit during the weld interval.

END WELD CIRCUIT 59

The end weld circuit provides a pulse (FIG. 7p) to the weld timer 12 to end the weld interval.

The normally nonconductive input transistor 36Q of the end weld circuit 59 conducts in response to any one of three possible positive inputs to the base thereof. The desirable input is a positive pulse applied thereto through the resistor 110R from the end ratio detector indicating that the weld contact resistance has fallen to its end ratio. Another possible input is a positive potential applied to said base through line 87 from the low limit memory circuit 71 which will occur if the end ratio is reached prior to the end of the low limit period. The last of these inputs to the base of input transistor 36Q is a positive potential applied thereto through line 88 from the lockout timer 68, which will occur if the end ratio has not been reached prior to the end of the lockout period.

The next transistor in the end weld circuit, transistor 37Q is normally maintained conductive by base current flow from resistor 116R, the capacitor 20C normally being held discharged so as not to interfere with conduction of transistor 37Q. More particularly, the upper plate of capacitor 20C is normally held at the base potential of transistor 37Q by connection thereto by resistor 115. The lower plate of capacitor 22C is normally held at fixed value above the reference potential, limited by the zener 2ZE, as a result the normally high collector potential of aforementioned transistor 36Q applied thereto by diode 41E and/or as result of the normally high potential applied thereto through line 85, diode 42RE, resistor 9R and the emitter of normally conductive output transistor 33Q of the low limit timer 67.

Thus, while either the low limit timer output line 85 or the collector of transistor 36Q remains at a high potential, the transistor 37Q remains conductive. In other words, diodes 41RE and 42RE act as an OR gate to apply positive potential to the point 138 when either or both are conductive. Since the low limit timer output line 85 remains at a high potential until the end of the low limit timer period, the transistor 37Q cannot be energized to cause an end weld pulse prior to the end of the low limit period, even if the weld contact resistance reaches its end ratio and causes transistor 36Q to conduct. Thus, it is only after the end of the low limit period that the transistor 37Q will respond to conduction of transistor 36Q.

When the transistor 36Q is conductive at the end of the low limit period or begins conduction thereafter, the diode 41RE blocks and the lower plate of capacitor 20C is immediately lowered in potential by resistor 113R causing the capacitor 20C to transmit a negative going pulse to the base of transistor 37Q for blocking same. Capacitor 20C subsequently charges through the resistive lines 116R, 115R, 113R to terminate the negative going pulse on base of transistor 37Q. The high collector potential of the blocked transistor 37Q is applied to normally blocked transistor 38Q to render same conductive whereby said high collector potential appears at the emitter of transistor 38Q. The feedback, resistor 102R applies such to the high emitter potential of transistor 38Q back to the base of transistor 36Q to maintain same conductive for a short period determined by the charge rate of capacitor 20C. The high emitter potential of transistor 38Q is applied also through resistor 121R to the base of output transistor 39Q, appearing in the emitter circuit thereof at point 139 as a positive end weld pulse which is fed by line 61 to the weld timer 12 to cause the latter to terminate the weld interval and extinguish weld current. The end weld signal is designed to be a pulse of limited duration, rather than a continuous voltage, to avoid any possibility of malfunction in the weld timer as might occur in some types of timers. The end weld pulse is, however, of sufficient length as to allow the weld timer to terminate well current at any desired point in a cycle thereof, for example, at the end of a negative or positive half cycle, the former being illustrated in FIG. 7i.

Attention having been directed above to the operation of circuitry for determining the termination of the weld time as a function of the weld contact resistance, attention will now be directed to the operation of supplemental and auxiliary circuitry and, more particularly, the clamp and reset circuit 74 and timers 63, 64, 67 (with the memory circuit 71) and 68.

CLAMP AND RESET CIRCUIT 74

At times outside the weld interval, trigger transistors 24Q and 25Q (FIG. 4) are, respectively, blocking and conductive and clamping transistor 26Q normally conducts to draw clamping current through the clamping lines 77, 77a and 77b for holding the timers 63, 64, 67 and 68 and the R time base circuit 32 and end ratio detector 56 inoperative.

The weld signal (FIG. 7i), here a positive potential, is applied to the input line 76 of the clamp and reset circuit 74 from beginning to the end of the weld interval by the weld timer 12. Application of such positive potential to line 76, in place of the normal low clamping potential thereon, causes the diode 21RE to block whereby the later no longer clamps the anode of diode 22RE at a low, nonconductive potential. As a result, at the beginning of the weld interval (time $t_o$ in FIG. 8), diode 22RE conducts current from the positive potential line 22 through resistors 61R and 62R to the base of trigger transistor 24Q for rendering same conductive.

The trigger circuit 24Q, 25Q is arranged so that it will not switch easily from one state to another but, when the appropriate conditions are applied thereto, will switch very rapidly and definitely from one state to the other. Similar trigger circuits 30Q, 31Q and 32Q, 33Q appear on the initial blanking and low limit timers 64 and 67, respectively, and the following detailed description of the operation of trigger circuit 24Q, 25Q will also serve those succeeding trigger circuits.

With no input signal applied to its base, transistor 24Q is blocked for lack of base drive. Thus, trigger output transistor 24Q at its emitter and a fraction of this voltage appears at the emitter of transistor 24Q due to the voltage divider formed by resistors 64R and 66R. This emitter voltage further biases transistor 24Q against conduction.

The trigger circuit 24Q, 25Q has a high degree of noise immunity. For example, if resistors 64R and 66R are equal, transistor 24Q will not conduct easily since it will be necessary for the input signal thereto to more than equal half the supply voltage existing across lines 22 and 23. Moreover, the capacitor 30C aids in filtering out transients and it will be necessary for transients to have considerable energy to cause transistor 24Q to conduct. The type of transients expected to appear in this circuit will not have sufficient energy.

Given a rising input signal to the base of input trigger transistor 24Q, said transistor will begin to conduct slightly at some point on the rise. This slight conduction causes a slight reduction in collector potential which in turn results in a slight reduction in current flow through output transistor 25Q and, hence, in a slight reduction in the bias on the emitter of input transistor 24Q. This circular action continues rapidly and as a result, the trigger circuit switches, input transistor 24Q becoming conductive and output transistor 25Q blocking. Complete switching occurs typically in less than the microsecond. Collector resistor 65R is preferably substantially larger than emitter resistor 66R so that the emitter voltage of transistor 24Q is much lower when it is conducting than when it is blocking. Hence, the input signal to the base of transistor 24Q must be greatly reduced from its "turn-on" value before the trigger circuit 24Q, 25Q reset. This feature provides still more noise immunity.

When the base potential of transistor 24Q drops by a sufficient, relatively large amount, the current flow in input transistor 24Q will lessen slightly, its collector voltage will rise slightly, output transistor 25Q will conduct slightly, and as a result, the emitter bias on input transistor 24Q will rise. This in turn further decreases conduction of transistor 24Q. This circular action continues and thus, the transistor 24Q rapidly and definitely blocks, the transistor 25Q unblocks and the trigger 24Q, 25Q is reset.

It will be noted that the general switching sequence described above with respect to the transistors 24Q, 25Q, providing for rapid, definite switching and high noise immunity, is also a characteristic of the trigger circuits 16Q, 17Q and 37Q, 38Q of the synch circuit 43 and end weld circuit 59, respectively.

Returning to the beginning of the weld interval, when trigger input transistor 24Q is rendered conductive and trigger output transistor is blocked by the appearance of the positive weld time signal on the line 76, the resulting low emitter potential of output transistor 25Q is applied through resistor 68R to the base of clamp transistor 26Q rendering same nonconductive. Thus, the clamp lines 77, 77a and 77b assume a high potential and clamping current is no longer drawn therethrough. This allows timing circuits 63, 64, 67 and 68 to begin timing their respective periods as hereinafter described and enables operation of the R generator 39 and end ratio detector 56 as hereinabove described.

The occurrence of low emitter potential on transistor 25Q at the beginning of the weld interval simultaneously causes a negative pulse to be coupled through capacitor 14C and reset line 78 to the bases of the input transistor 28Q, 34Q and 41Q of the flip-flops of the high limit timer 63, low limit memory 71 and lockout timer 68 to reset said flip-flops.

TIMING CIRCUITS 63, 64, 67 AND 68

With the removal of the low clamping potential on clamp line 77 at the beginning of the weld interval, the upper plates of timing capacitors 15C, 17C, 18C and 21C of the high limit, initial blanking, low limit, and lockout timers no longer exist whereby charging current begins to flow through these timing capacitors. More particularly, the high limit timing capacitor 15C charges through timing potentiometers 146 and 147, initial blanking timing capacitor 17C charges through timing potentiometer 159, low limit timing capacitor 18C charges through timing potentiometers 162 and 163 and lockout timing capacitor 21C charges through timing potentiometers 171 and 172, all from the timing line 148.

INITIAL BLANKING TIMER 64

The first of the timers to time out is the initial blanking timer 64. This occurs after the first few cycles of the weld interval in which the weld resistance will likely be erratic. During this time, therefore, the weld contact resistance is not monitored since it is not then indicative of the weld condition. Thus, the initial blanking timing capacitor 17C reaches a charge at the end of the initial blanking period (time $t_1$ in FIG. 8) sufficient to fire trigger input transistor 30Q which results in blocking of trigger output transistor 31Q and the appearance of a low potential (FIG. 7k) on the initial blanking line 84 connected therefrom to the peak pulse circuit 31 enabling the latter thereafter to function.

LOW LIMIT TIMER 67 AND LOW LIMIT MEMORY 71

The next timer to time out is the low limit timer (time $t_4$ of FIG. 8).

In the normal state of the low limit trigger 32Q, 33Q prior to the end of the low limit period, transistor 33Q conducts and would apply its high emitter potential through line 86, resistor 98R, diode 39RE and resistor 101R to the base of low limit flip-flop input transistor 34Q, except that diode 39RE is normally clamped nonconductive by the low potential applied to its anode by 38RE and line 57a from the end ratio detector 56. However, should the end ratio be reached early (e.g., time $t_3$ in FIG. 8), e.g., before the low limit timer 67 times out (time $t_4$ in FIG. 8), the low potential applied to the base of low limit flip-flop transistor 34Q (FIG. 5), as a result of conduction through the clamp diode 38RE and line 57a to the end ratio detector 56, will be removed. More particularly, the positive potential produced will block diode 38RE and thus enable diode 39RE to conduct through the base of flip-flop transistor 34Q to render same conductive.

Figure 6:
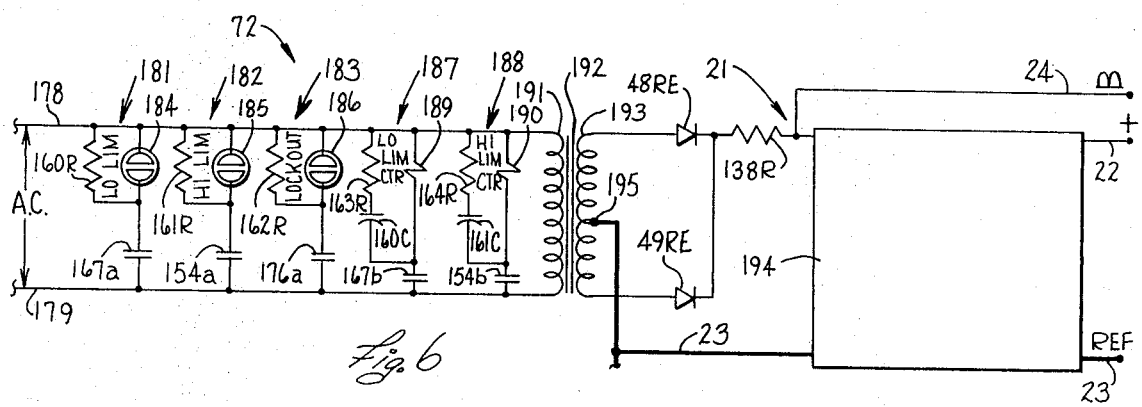
FIG. 6 is a schematic circuit diagram of the alarm unit and power supply of FIG. 1.

Conduction of the flip-flop input transistor 34Q is through the low limit relay 167. Thus, the relay 167 closes the contacts 167a and 167b (FIG. 6) thereof which energizes the low limit alarm lamp 184 and low limit counter 189, respectively, thus indicating the occurrence of an end ratio condition prior to the end of the low limit period and hence of a questionable weld. Further, the aforementioned energization of transistor 34Q (FIG. 5) results in blocking of transistor 35Q and the high collector potential thereof is applied through line 87 to the base of input transistor 36Q (FIG. 3) of the end weld circuit 59 for energizing same. It will be recalled that the remainder of the end weld circuit, more particularly the end weld transistor 37Q, cannot be energized at this time because of the high potential applied to point 138 through line 85 from the low limit timer 67.

At the end of the low limit time, the potential on the low limit timing capacitor 18C, applied through diode 37RE and resistor 93R to the base of low limit trigger input transistor 32Q, is sufficient to fire same. Conduction of input transistor 32Q drops the collector potential thereof, causing the emitter follower 33Q to become nonconductive. As a result, the emitter potential on transistor 33Q drops. Thus, the diode 42RE blocks and no longer applies a high potential through line 85 to the end weld circuit 59. This allows the energization of end weld circuit 59 at the end of the low limit time by the positive potential applied by low limit memory flip-flop 34Q, 35Q through line 87 to the input of the end weld circuit, as a result of the prior end ratio condition.

Assuming, on the other hand, that an end ratio condition has not been reached prior to timing out of the low limit timer 67 (e.g., as in curves B, C and D of FIG. 8) the low limit memory flip-flop 34Q, 35Q would remain unenergized both before and after timing out of the low limit timer. As a result, the low limit relay 167, alarm lamp 184 and counter 189 would remain unenergized for that weld and the line 87 would apply no positive input to the end weld circuit 59. In such event the sole consequence of timing out the low limit timer 67 would be the removal of the positive potential from line 85 to the end weld circuit so that later energization of the input of the end weld input transistor 36Q would result in an end weld pulse.

The most desirable condition of operation is that an end weld condition will occur between the timing out of the low limit timer and the timing out of the high limit timer in which case weld current will cease to flow and none of the alarms 184, 185 and 186 will be actuated. In such event, the weld made has a very high probability of being a good weld. An example of such a resistance drop condition is curve B of FIG. 8, the end ratio being reached at the time $t_5$.

HIGH LIMIT TIMER 63

In the event that an end ratio condition has not previously occurred, the high limit timing capacitor 15C (FIG. 4) will have charged through potentiometers 146 and 147 to a level sufficient to fire the unijunction 37Q marking the end of the high limit period. Firing of the unijunction 27Q applies current through the diode 31RE, resistor 77R and diode 32RE to the base of high limit flip-flop transistor 26Q rendering same conductive through the relay coil 154 to energize the high limit alarm 185 and high limit counter 190, thereby bringing to the attention of the operator the failure of the welding machine to achieve a weld within the high limit time. Such would indicate a questionable weld and possible degradation of process variables requiring maintenance. Had the end ratio occurred prior to the end of the high limit time, the flip-flop 28Q, 29Q would, of course, not be energized and in consequence, the high limit alarm 185 and counter 190 would not be energized.

Curve C (FIG. 8) is an example of a resistance drop which reaches its end ratio after timing out of the high limit timer and the consequent high limit alarm at time $t_6$. It will be noted that timing out of the high limit timer has no effect upon the operation of the end ratio and end weld circuits 56 and 59 whereby an end ratio may be normally reached, e.g., at the time $t_7$, between timing out of the high limit timer and the timing out of the lockout timer, to terminate the weld time.

LOCKOUT TIMER 68

It is also possible that the resistance may decline from the peak so slowly as to fail to reach an end ratio prior to the timing out of the lockout timer at time $t_8$ in FIG. 8, an example being curve D of FIG. 8. In such case, the end of the lockout period, the lockout timing capacitor 21C (FIG. 5) will have been charged sufficiently, through lockout timing potentiometers 171 and 172, as to fire the unijunction transistor 40Q. As in the case of the high limit timer, firing of the unijunction causes current flow through diode 45RE, resistor 129R, diode 46RE and the base of input flip-flop transistor 41Q to cause conduction thereof. This energizes the lockout relay 176 thereby energizing the lockout alarm lamp 186 to indicate that an end ratio has not been achieved with the maximum time allotted for welding and that in consequence the weld is probably a bad one. Such energization of the lockout flip-flop 41Q, 42Q results in blocking of transistor 42Q. The resulting high collector potential thereof is applied through resistor 136R and line 88 to the input of the end weld circuit 59 causing same to provide an end weld pulse to the weld timer 12 for terminating the weld.

At the end of the weld interval, the weld signal from the weld timer 12 drops in potential and the weld timer 12 draws current through resistor 60R and diode 29RE (FIG. 4) of the clamp and reset circuit 74 thereby clamping the anode of the diode 22RE at a low potential and causing said diode to block. This removes base drive from the transistor 24Q causing same to block and thus causing transistor 24Q to conduct, thus resetting the trigger 24Q, 25Q. Conductive transistor 25Q applies a positive base drive to the clamping transistor 26Q to render same conductive through the clamp line 77 to clamp the timing capacitors of the timers 63, 64, 67 and 68. The resulting low clamping potential on line 77a causes the clamping diode 51RE to conduct for clamping the base of R time base flip-flop transistor 15Q at a low potential. This maintains said transistor blocked and thus prevents the R time base circuit 32 from providing drive to the synch circuit and R generator. In addition, the clamp line 77b clamps, through the resistor 56R and diode 17RE (FIG. 3), the peak R storage capacitor 12C in a discharged condition, preventing operation of the end ratio detector.

The above-described embodiment of the invention, senses the weld contact resistance once in each cycle of weld current and such has been found satisfactory. If desired, however, it is fully contemplated that such sensing could be carried out twice each cycle, since the weld current waveform has both a positive and a negative peak. This alternative to the preferred embodiment could be carried out, for example, by substituting and iron core transformer feeding a full wave rectifier, for the air core coil 26 and amplifier-integrator 28 of FIG. 1, to provide a full wave rectified current signal on line 34.

MODIFICATION

FIG. 9 discloses a modification to the R generator circuit wherein a small capacitor 30C is added across the secondary winding 126 of transformer 1T. The effect of the added capacitor 30C is to slightly delay the electrode voltage signal E from the transformer 1T. As a result the 1/I pulse (FIG. 10a) straddles the $E_T$ (FIG. 10b) point in the waveform E, i.e., the point in the voltage across line 121 and 122 occurring at the weld current amplitude peak whereat dI/dt is zero. Though perfect centering of the 1/I pulse on the $E_T$ point may be difficult to achieve in practice, the aforementioned straddling enables the spurious over and under values of the signal E occurring before and after the true peak $E_T$ point to at least partially cancel each other out during the 1/I pulse time thereby improving upon the accuracy of the signal R. Thus, although the embodiment of FIGS. 1 through 8 provides a perfectly acceptable level of performance, the modification of FIG. 9 enables it to be brought in closer to perfect accuracy in the production of the resistance signal R.

Although a particular preferred embodiments of the invention has been described hereinabove for purposes of illustration, modifications and variations thereof within the scope of the appended claims are fully contemplated.

The embodiments of the invention in which I claim an exclusive property or privilege are defined as follows:

1. A method for generating a signal proportional to the weld contact resistance in an AC resistance welding machine, comprising the steps:

sensing the weld current;

detecting a peak amplitude point in the waveform of said sensed current;

establishing a time period of length inversely proportional to the peak amplitude of said sensed current;

deriving a current proportional to the true peak weld electrode voltage; and deriving a signal proportional to the product of said derived current and said time period, said signal being proportional to the weld contact resistance.

2. The method defined in claim 1, in which:

the true weld electrode voltage peak occurs simultaneously with the weld current peak;

said deriving of a current directly proportional to the true peak weld electrode voltage includes the steps of continuously sensing a voltage waveform having the weld electrode voltage waveform as at least one component thereof and which may have as a second component superimposed thereupon an inductive signal due to inductive pickup and which is a function of cyclical amplitude changes in the weld current waveform and producing a current waveform which continuously and proportionally follows said voltage waveform;

in which said derived current is a segment of said produced current waveform of length equal to said time period and taken at said peak amplitude point in the weld current waveform; and in which said time period is a small fraction of a weld current half cycle;

whereby the rate of change of weld current amplitude is zero during said time period, said inductive signal component is zero during said time period, and derived current is proportional to the true peak weld electrode voltage.

3. A method for generating a signal proportional to the weld contact resistance in an AC resistance welding machine, comprising the steps:

sensing a parameter related to the weld current;

deriving a voltage proportional to the weld current;

detecting the occurrence of the peak amplitude point of said voltage proportional of said weld current;

producing a pulse of length inversely proportional to the peak amplitude of said sensed current, sensing the weld electrode voltage;

produced a current of amplitude proportional to the weld electrode voltage sensed;

charging a storage device at the occurrence of said peak amplitude point for the period of said pulse and with said current; and whereby the voltage across said storage device constitutes said signal proportional to the weld contact resistance.

4. The method of claim 3, in which said parameter sensed is a rate signal proportional to the time rate of change of weld current and in which said voltage proportional to the weld current is derived by integrating said rate signal.

5. The method of claim 3, in which said occurrence of said peak amplitude point of the weld current waveform is detected by sensing a drop to zero in the rate of change of weld current amplitude.

6. The method defined in claim 3, in which said current is constrained from appreciable changes in amplitude during said charging by limiting the length of said pulse to a small fraction of the time of a half cycle of weld current.

7. The method of claim 3, including the step of producing a peak pulse beginning at the occurrence of the peak amplitude of the weld current waveform and terminating same after the conclusion of said pulse inversely proportional to the peak weld current amplitude whereby the charge on said storage device comprises a pulse of length corresponding to the length of the peak pulse.

8. The method of claim 3, in which the value of the weld contact resistance signal is generated several times during the course of a weld and at least once per cycle of weld current.

9. A resistance feedback method for weld control in an AC resistance welding machine, comprising the steps:
sensing the weld current;
detecting a peak amplitude point in the waveform of said sensed current;
establishing a time period of length inversely proportional to the peak amplitude of said sensed current;
deriving a current proportional to the true peak weld electrode voltage;
deriving a signal proportional to the product of said derived current and said time period, said signal being proportional to the weld contact resistance;
determining when the weld contact resistance has fallen to a preselected end ratio and in consequence terminating the weld current.

10. The method of claim 9, including the step of signaling the failure of the weld contact resistance to reach a preselected end ratio within a preselected time period of weld current flow so as to warn of possible degradation of process variables.

11. Apparatus for generating a signal proportional to the weld contact resistance in an AC resistance welding machine, comprising in combination:
weld current means for sensing a parameter related to the weld current and for deriving a signal proportional to the weld current;
peak pulse means responsive to said weld current means for detecting the occurrence of a weld current amplitude peak;
time base means responsive to said weld current means and peak pulse means for producing a time pulse of length inversely proportional to said weld current amplitude peak;
weld electrode voltage means for sensing the weld electrode voltage;
R generator means, including a storage device, and responsive to said peak pulse means, time base means and weld electrode voltage means for producing a current of amplitude proportional to said sensed voltage and therewith charging said storage device at the time of said weld current amplitude peak and for the period of said time pulse; and
whereby the charge amplitude on said storage device is proportional to the weld contact resistance.

12. The apparatus defined in claim 11, in which:
said resistance welding machine includes weld electrodes and a circuit for supplying weld current thereto;
said weld current means comprises an air core coil inductively coupled to said circuit for feeding weld current to said weld electrodes, said air core coil producing an output proportional to the time rate of change of weld current flow to said electrodes; and
integrator means responsive to said air core coil output for integrating said time rate of change of weld current signal to produce said signal proportional to weld current.

13. The apparatus defined in claim 12, in which:
said integrator means comprises a high gain, phase inverting amplifier having an input impedance sufficiently high so as not to draw significant current from said air core coil;
a capacitive feedback line connected between the input and output of said amplifier, the current flow through said air coil core and feedback path being equal and proportional to the time rate of change of the amplifier output voltage; and
whereby the output voltage of said amplifier is proportional to the weld current.

14. The apparatus defined in claim 11, in which:
said peak pulse means comprises switch means responsive to peaking of said weld current signal for changing state;
a one shot circuit energizable in response to said change of state of said switch means;
a peak pulse line connected from said one shot circuit to said storage device for normally holding same discharged and responsive to energization of said one shot circuit for allowing charging thereof.

15. The apparatus defined in claim 14, including a further line connected from said one shot circuit to said time base means and responsive to energization of said one shot circuit for causing said time base means to initiate said time pulse.

16. The apparatus defined in claim 14, in which:
said switch means comprises first and second transistors, said transistors having opposite rest states, said first transistor being connected to a said second transistor to control the state thereof;
feedback means connected from the output of said second transistor to the input of said first transistor and responsive to a change in state of said second transistor for assisting switching of said first transistor from its rest state; and
means responsive to said weld current signal for causing said first transistor to switch at said weld current amplitude peak.

17. The apparatus defined in claim 14, including blanking potential means connected to said switch means for preventing changes in state thereby during a preselected initial portion of the weld interval whereby to prevent charging of said storage device during said initail period.

18. The apparatus defined in claim 11, in which:
said time base means includes switch means connected to said peak pulse means and responsive to said weld current amplitude peak detection thereby for switching from a rest to an energized state to initiate said time pulse;
current supply means responsive to the output of said weld current means for producing a further current proportional to said weld current and further storage means in series therewith for charging with said further current;
firing means responsive to a preselected charge on said further storage device for discharging same; and
transfer means connected in series with said further storage means and firing means and to said switch means and responsive to discharge of said further storage means through said firing means for resetting said switch means to its rest state and thereby terminating said time pulse.

19. The apparatus defined in claim 18, including means connecting said switch means to said first-mentioned storage device for preventing application of said first-mentioned current to said first-mentioned storage storage device when said switch means is in its rest state.

20. The apparatus defined in claim 18, including disabling means connected from said switching means to said further storage means for maintaining same discharged to prevent firing of said firing means while said switch means is in its rest state but for allowing charging of said further storage means when said switch means is in its energized state.

21. The apparatus defined in claim 11, in which:
said peak pulse means generates a peak pulse at the time of said weld current amplitude peak and extending for a preselected time therebeyond; and including:
first clamp means responsive to said time base means for preventing application of said current to said storage device at all times except during said time pulse;
second clamp means responsive to said peak pulse means for holding said storage device in a discharged state at all times except during said peak pulse, the charge appearing across said storage device being a pulse having voltage rise time determined by said time pulse and a total duration determined by said peak pulse and a peak amplitude proportional to the weld contact resistance; and means interconnecting said time base means and peak pulse means for causing simultaneous initiation of said peak pulse and time pulse, the time duration of said peak pulse exceeding the maximum time duration of said time pulse.

22. The apparatus defined in claim 11, in which:

said weld electrode voltage means produces a voltage signal at least a component of which is proportional to the weld electrode voltage;

in which said R generator means includes a transistor connected in series with said storage device and means responsive to said weld electrode voltage means for causing said transistor to conduct a current proportional to said voltage signal, whereby said current applicable to said storage device by said transistor at least includes a component instantaneously proportional to the weld electrode voltage; and in which said time pulse occurs at the peak amplitude point of the weld current and weld electrode voltage waveforms and is of duration equal to a small fraction of the duration of the half cycle of said weld electrode voltage waveform whereby the charge current supplied to said storage device by said transistor will be at least substantially unchanging and equal to the peak amplitude of the weld electrode voltage.

23. In an apparatus for generating a signal proportional to the weld contact resistance in an AC welding machine during the weld interval thereof, said machine having weld electrodes, the combination comprising:

weld current sensing means for providing a signal proportional to and following the waveform of the weld current;

switch means connected to said weld current sensing means and responsive to peaking of the weld current waveform for producing an output pulse at said peak;

blanking means for rendering said switch means nonresponsive during an initial portion of the weld interval;

a one shot circuit energizable in response to said output pulse and having first and second output terminals, said one shot circuit drawing current through said first output terminal in its rest state and when energized producing a positive peak pulse on said first output terminal and a negative going pulse on said second output terminal, said one shot circuit including timing means for terminating said peak pulse and negative pulse within a preselected time;

a timing capacitor and charging means supplied with said weld current proportional signal from said weld current sensing means for charging said timing capacitor at a rate proportional to the instantaneous weld current amplitude;

flip-flop circuit having an output terminal conductive when said flip-flop is in its rest condition;

means responsive to initiation of said negative pulse for energizing said flip-flop circuit, said flip-flop circuit when energized having a positive time pulse of duration inversely proportional to the weld current peak amplitude on said output terminal thereof;

clamp means connected to said timing capacitor for holding same discharged at times outside the weld interval;

means responsive to conduction through said output terminal of said flip-flop for clamping said timing capacitor discharged but for allowing charging thereof upon appearance of said time pulse at said flip-flop output terminal;

a firing circuit conductive in response to a preselected charge level on said timing capacitor;

means responsive to conduction from said timing capacitor through said firing circuit for resetting said flip-flop and terminating said time pulse;

means connected across said weld electrodes for providing an electrode voltage signal having at least a component instantaneously proportional to the weld electrode voltage;

current producing means responsive to said electrode voltage signal for continuously producing a current instantaneously proportional thereto;

a storage capacitor;

means connecting the output of said current producing means to said storage capacitor;

means responsive to conduction through said first terminal of said one shot circuit for shunting current flow from said current device around said storage capacitor so as not to charge same;

means responsive to current flow in said output terminal of said flip-flop for clamping said storage capacitor in a discharged condition, said storage capacitor charging from the output of said current producing device during coincidence of said time and peak pulses; and whereby said storage capacitor charges at a rate proportional to the instantaneous weld electrode voltage, for a time inversely proportional to the weld current peak amplitude and discharges at the end of said peak pulse to produce a resistance pulse proportional to the instantaneous weld contact resistance.

24. In a resistance feedback welding control for an AC resistance welding machine, the combination comprising:

means providing a peak output in response to occurrence of the peak amplitude point in a cycle of weld current;

time means for producing a time pulse of length inversely proportional to the weld current amplitude in said cycle;

a storage device;

means responsive to the weld electrode voltage for charging said storage device at a rate proportional thereto, responsive to said peak output for allowing said charging at said peak amplitude point and responsive to said time pulse for carrying out said charging for a duration equal to the length of said time pulse;

output means responsive to the charge on said storage device for producing a resistance signal of amplitude proportional to the weld contact resistance during said cycle;

end ratio means connected to said output means for detecting a drop in the amplitude of successive resistance signals to a preselected fraction of the maximum resistance signal produced and thereupon producing an end ratio signal; and end weld means responsive to said end ratio signal for terminating the weld interval.

25. The apparatus defined in claim 24 in which said end ratio means comprises a firing device having first and second input terminals for firing in response to an increase in potential on said first terminal and a decrease in potential on said second input terminal;

a switch element having an input terminal and an output terminal;

a fraction storage capacitor connecting said first input terminal with said switch input terminal;

voltage divider means responsive to said resistance signals for applying a preselected fraction of increasing amplitude ones of said resistance signals to said fraction storage capacitor;

synch means for generating a synch pulse immediately after each of said time pulses and means for applying said synch pulses to said second input terminal to drop the potential thereon; and means applying said resistance signals to said second input terminal at the time of said synch pulses for establishing a potential thereon equal to the amplitude of said resistance signal, whereby when said resistance signals have decreased in amplitude to a preselected value, said fraction storage capacitor will discharge through said firing means, switching said switch element and causing an end ratio signal to appear on the output terminal thereof.

26. The apparatus defined in claim 25, including means for generating a clamping signal at all times outside the weld interval and means for applying said clamping signal to said fraction storage capacitor for maintaining same discharged.

27. The apparatus defined in claim 25, in which:
said synch means comprises a trigger circuit having input and output terminals and a coupling capacitor connecting said trigger input terminal to said time means, said coupling capacitor being responsive to a change in state of said time means corresponding to termination of said time pulse for energizing said trigger circuit; and
charging means connected to said timing capacitor for charging same at a predetermined rate, said trigger circuit being responsive to a preselected charge level on said coupling capacitor for resetting to a deenergized state, a synch pulse appearing on said output of said trigger circuit while said trigger circuit is energized.

28. The apparatus defined in claim 24, in which:
said end weld means comprises switch means and trigger means each having an input terminal and an output terminal;
means coupling the input terminal of said switch means to the output of said end ratio means for energizing said switch means in response to an end ratio signal;
means connecting the output of said switch means to the input of said trigger means for switching said trigger means from its rest state in response to energization of said switch means; and
means responsive to said switching of said trigger means for terminating the weld interval.

29. The apparatus defined in claim 28, including: low limit timing means for timing a period extending from the beginning of the weld interval, during which weld current is not to be terminated, and producing during such periods an output corresponding to that said energized switch means;
in which said means connecting the output of said switch means to the input of said trigger means comprises a coupling capacitor connected to the input of said trigger means;
an OR gate having one leg thereof connecting said capacitor to the output of said switch means and the other leg thereof connecting said capacitor to said low limit timing means, said coupling capacitor being responsive to nonconduction of said OR gate for causing said switching of said trigger means; and
charging means for charging said capacitor at a preselected rate to thereafter reset said trigger means.

30. The apparatus defined in claim 28, including a feedback link connected from the output of said trigger means to the input of said switch means for holding said switch energized while said trigger circuit is out of its rest state.

31. The apparatus defined in claim 28, including:
low limit timer means for timing a low limit period starting at the beginning of the weld interval and during which weld current is not to be terminated;
memory means responsive to the occurrence of an end ratio condition prior to timing out of said low limit timing means for producing an output in response to such occurrence and means coupling said memory output to the input of said switch means for energizing same;
lockout timing means for timing a lockout period starting at the beginning of the weld interval and terminating at the maximum allowable length of said weld interval in the absence of a prior end ratio signal and for producing a lockout output at the end of said lockout period and means applying said lockout output to the input of said signal means for energizing same; and
whereby said switch means is energized in response to and for the duration of any one of an end ratio signal, a memory output or a lockout output.

32. The device defined in claim 24, including:
low limit timer means for providing an output at the end of an interval prior to the end which weld current may not be terminated;
a memory circuit connected to said end ratio means and said low limit timing means and responsive to the occurrence of an end ratio signal prior to timing out of said low limit timing means for producing a memory output;
lockout timing means for producing a lockout output at the end of the maximum time allowed for a weld and means connected thereto for rendering same inoperative in response to a prior termination of weld current;
in which said end weld means includes switch means alternatively energizable in response to any of and at least one of said end ratio signal, memory output and lockout output for producing an output;
trigger means and means responsive to switching of said trigger means from its rest condition for terminating the weld interval; and
means coupling the output of said switch means and of said low limit timer means to the input of said trigger means for switching said trigger means from its rest condition in response to coincidence of said output of said low limit timing means and said switch means.

33. The apparatus defined in claim 24, including: high level timing means energizable in response to initiation of the weld interval for timing a high limit;
high limit alarm means energizable in response to timing out of said high limit timing means for indicating possible degradation of weld process variables requiring future maintenance; and
means responsive to termination of the weld interval prior to timing out of said high limit timing means for deenergizing said high limit timing means.

34. The apparatus defined in claim 24, including: initial blanking timer means for preventing said peak output before a first time in the weld interval;
low limit means for preventing response of said end weld means to an end ratio signal occuring before a second time in said weld interval and including low limit alarm means for signaling such occurrence of an end ratio signal prior to said time;
high limit timer means including high limit alarm means for signaling failure of said end weld means to terminate said weld interval prior to a third time to indicate a degradation in process variables;
lockout timer means responsive to failure of said end weld means to terminate said weld interval prior to a fourth time for terminating said weld interval at said fourth time; and
clamp and reset means responsive to initiation of said weld interval for resetting said initial blanking, high limit, and lockout timer means and said low limit means for operation and responsive to termination of said weld interval for preventing timing of said initial blanking, high limit and lockout timer means and said low limit means as well as for preventing said resistance signal and end ratio signal thereafter.